United States Patent
Arima et al.

(10) Patent No.: US 11,095,226 B2
(45) Date of Patent: Aug. 17, 2021

(54) SWITCHING POWER SUPPLY DEVICE HAVING FAILURE PROTECTION FUNCTION, AND METHOD FOR CONTROLLING THE SAME

(71) Applicants: Satoshi Arima, Isehara (JP); Hiroki Matsuda, Zama (JP)

(72) Inventors: Satoshi Arima, Isehara (JP); Hiroki Matsuda, Zama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/591,482

(22) Filed: Oct. 2, 2019

(65) Prior Publication Data
US 2020/0112264 A1   Apr. 9, 2020

(30) Foreign Application Priority Data
Oct. 3, 2018   (JP) .............................. JP2018-188206

(51) Int. Cl.
*H02M 3/335*   (2006.01)
*H02H 1/00*   (2006.01)
*H02H 7/12*   (2006.01)

(52) U.S. Cl.
CPC ...... *H02M 3/33592* (2013.01); *H02H 1/0007* (2013.01); *H02H 7/1213* (2013.01)

(58) Field of Classification Search
CPC ............ H02M 3/33592; H02H 1/0007; H02H 7/1213
USPC ....................................................... 363/21.14
See application file for complete search history.

(56) References Cited

U.S. PATENT DOCUMENTS

| | | | | |
|---|---|---|---|---|
| 6,088,244 A | * | 7/2000 | Shioya | ............... H02M 1/32 323/902 |
| 2015/0372603 A1 | | 12/2015 | Tang et al. | |
| 2016/0072399 A1 | * | 3/2016 | Kikuchi | ........... H02M 3/33523 363/21.14 |

FOREIGN PATENT DOCUMENTS

JP            H1198834 A       4/1999

* cited by examiner

*Primary Examiner* — Shawki S Ismail
*Assistant Examiner* — Monica Mata
(74) *Attorney, Agent, or Firm* — Holtz, Holtz & Volek PC

(57) ABSTRACT

A switching power supply device includes a voltage conversion transformer, a primary-side control semiconductor device, a rectification and smoothing circuit, an output voltage detection circuit, a failure detection circuit, and a switch. The primary-side control semiconductor device generates a driving signal which controls a switching element connected to a primary winding of the transformer. The rectification and smoothing circuit is connected to a secondary winding of the transformer. The output voltage detection circuit detects a secondary-side output voltage of the transformer and transmits a feedback signal corresponding to the output voltage to the primary-side control semiconductor device through an insulated signal transmitter. The failure detection circuit detects a failure on a secondary side of the transformer. The switch cuts off a current flowing to the insulated signal transmitter if the failure detection circuit detects a failure.

21 Claims, 19 Drawing Sheets

SWITCHING POWER SUPPLY DEVICE HAVING FAILURE PROTECTION FUNCTION, AND METHOD FOR CONTROLLING THE SAME

CROSS REFERENCE TO RELATED APPLICATION

This application is based upon and claims the benefit of priority under 35 USC 119 of Japanese Patent Application No. 2018-188206 filed on Oct. 3, 2018, the entire disclosure of which, including the description, claims, drawings and abstract, is incorporated herein by reference in its entirety.

BACKGROUND OF THE INVENTION

1. Field of the Invention

The present invention relates to a direct-current power supply device including a switching power supply semiconductor device that controls a switching element connected in series to a primary winding of a voltage conversion transformer and relates to an effective technique applicable to, for example, a switching power supply device forming an AC-DC converter, such as an AC adapter, and a method for controlling the switching power supply device.

2. Description of Related Art

One of switching power supply devices according to the related art is a switching power supply device (insulated DC-DC converter) which includes a MOS transistor (insulated gate field effect transistor) as a switching element for intermittently supplying a current to a primary coil of a transformer and a control circuit (IC) for controlling the turn-on and turn-off of the switching element. In the switching power supply device, a current induced in a secondary coil by the flow of the current to the primary coil is rectified by a diode, is smoothed by a capacitor, and is then output.

In addition, direct-current power supply devices include a diode bridge circuit that rectifies an alternating-current voltage and an insulated AC-DC converter, such as an AC adapter in which the switching power supply device (insulated DC-DC converter) decreases the direct-current voltage rectified by the circuit and converts the voltage into a direct-current voltage with desired potential.

Some of the insulated AC-DC converters according to the related art have a protection function which notifies a control circuit on the primary side of the occurrence of a failure on the secondary side and stops switching control by the control circuit on the primary side in a case where the failure, such as the flow of an excessive output current due to a short-circuit of a load or the disconnection of a secondary-side circuit, occurs.

For example, JP H11-98834 A discloses a switching power supply device which notifies a control circuit on the primary side of the occurrence of a failure on the secondary side through a photocoupler.

In the switching power supply device disclosed in JP H11-98834 A, a feedback voltage corresponding to a secondary-side output voltage is not transmitted to the control circuit on the primary side and switching control is performed using only the auxiliary winding voltage of a transformer. Therefore, a photocoupler for transmitting the feedback voltage to the primary side is not required. However, in a case where it is desired to provide a photocoupler for transmitting the feedback voltage in order to increase the controllability of the output voltage, the photocoupler needs to be provided separately from a photocoupler for notifying the control circuit on the primary side of the occurrence of a failure on the secondary side. As a result, there is a problem that the number of components increases and the cost or the mounting area increases.

In addition, in the power supply device disclosed in US 2015/0372603 A1, a differentiation circuit and a sample-and-hold circuit that holds the voltage of the auxiliary winding or a voltage obtained by dividing the voltage of the auxiliary winding are used in order to detect the rate of increase in the voltage of the auxiliary winding, which causes an increase in the circuit size of a primary-side control IC, an increase in chip area, and an increase in cost.

Further, the following is considered: the primary-side control IC having an external terminal for inputting the voltage of the auxiliary winding or the voltage obtained by dividing the voltage of the auxiliary winding is provided with an overvoltage protection function that detects an overvoltage state of the external terminal and stops switching control and the overvoltage protection function is activated to stop the switching control in a case where a failure occurs on the secondary side. However, for the overvoltage protection function, in a case where the overvoltage protection function is adjusted such that it does not work during a normal operation (the overvoltage protection function has a margin), the difference between the secondary-side output voltage during the overvoltage protection operation and the secondary-side output voltage during the normal operation is large. Therefore, there is a problem that it is necessary to use an expensive component with a large size and a high withstand voltage in the secondary-side circuit.

SUMMARY OF THE INVENTION

The invention has been made in view of the above-mentioned problems and an object of the invention is to provide a switching power supply device that can notify a primary side of the occurrence of a failure in a case where the failure occurs on a secondary side such that switching control is stopped, without providing a photocoupler for notifying a control circuit on the primary side of the occurrence of the failure on the secondary side, separately from a photocoupler for transmitting a feedback signal, which makes it possible to prevent an increase in the number of components and an increase in mounting area and to reduce the size of a power supply device, and a method for controlling the switching power supply device.

Another object of the invention is to provide a switching power supply device that can prevent an increase in circuit size and an increase in chip area, can be miniaturized, and does not require the use of an expensive component with a large size and a high withstand voltage in a secondary-side circuit and a method for controlling the switching power supply device.

To achieve at least one of the abovementioned objects, according to an aspect of the present invention, a switching power supply device includes:

a voltage conversion transformer including an auxiliary winding;

a primary-side control semiconductor device that generates a driving signal which controls turn-on and turn-off of a switching element connected in series to a primary winding of the transformer;

a rectification and smoothing circuit that is connected to a secondary winding of the transformer;

an output voltage detection circuit that detects a secondary-side output voltage of the transformer and transmits a feedback signal corresponding to the output voltage to the primary-side control semiconductor device through an insulated signal transmitter;

a failure detection circuit that detects a failure on a secondary side of the transformer; and a switch that cuts off a current flowing to the insulated signal transmitter, wherein the primary-side control semiconductor device includes:

a first external terminal to which a voltage corresponding to the feedback signal supplied from the output voltage detection circuit is input;

a second external terminal to which a voltage induced in the auxiliary winding or a voltage obtained by dividing the induced voltage is input; and an overvoltage detection circuit including a first voltage comparator that detects whether a voltage of the first external terminal is higher than a first predetermined threshold voltage and a second voltage comparator that detects whether a voltage of the second external terminal is higher than a second predetermined threshold voltage, in a case where the first voltage comparator and the second voltage comparator determine that the voltage of the first external terminal and the voltage of the second external terminal exceed the first threshold voltage and the second threshold voltage, respectively, the overvoltage detection circuit generates a signal to stop generation of the driving signal, and in a case where the failure detection circuit detects a failure, the switch is controlled such that the current flowing to the insulated signal transmitter is cut off.

According to the switching power supply device having the above-mentioned configuration, in a case where a failure occurs on the secondary side, the current of the insulated signal transmitter (photodiode) is cut off and the feedback signal changes. The control circuit on the primary side determines that the failure has occurred on the secondary side from the voltage of the external terminal based on the feedback signal and the voltage of the external terminal to which the auxiliary winding is connected and stops switching control for the switching element. Therefore, it is possible to reliably stop switching control on the primary side in a case where a failure occurs on the secondary side. In addition, in a case where a failure on the secondary side is detected, it is possible to stop switching control on the primary side, without providing a means (photocoupler) for transmitting a signal for notifying the occurrence of the failure on the secondary side separately from the insulated signal transmitter (photocoupler) for transmitting the feedback signal. Therefore, it is possible to prevent an increase in the number of components, an increase in mounting area, and an increase in cost and to reduce the size of a power supply device.

The current of the insulated signal transmitter (photodiode) is cut off by the detection of a failure on the secondary side and the feedback signal (VFB) to the first external terminal (FB) of the control circuit (power supply control IC) on the primary side changes. The voltage (VDMG) of the second external terminal (DMG) of the control circuit (power supply control IC) on the primary side rises. When the voltage (VDMG) exceeds the second threshold voltage (reference voltage VDMGLIM), switching control is immediately stopped. Therefore, there is little increase in the secondary-side output voltage during the overvoltage protection operation and the difference between the secondary-side output voltage during the overvoltage protection operation and the secondary-side output voltage during the normal operation is small. As a result, it is not necessary to use a component with a high withstand voltage in the secondary-side circuit.

In addition, according to the above-mentioned configuration, in the control circuit on the primary side, determination can be performed using only the voltage comparison circuit (comparator). Therefore, it is not necessary to use a large-size circuit, such as a sample-and-hold circuit or a differentiation circuit, and to prevent an increase in chip area.

Further, switching control on the primary side is stopped on the basis of the voltage of the second external terminal (DMG) to which the voltage induced in the auxiliary winding or the voltage obtained by dividing the induced voltage is input. Therefore, in a case where the voltage is divided by an external element (resistive element), the voltage division ratio is appropriately set by the external element to easily adjust the voltage at which switching is stopped.

Preferably, the overvoltage detection circuit further includes a timer circuit that measures a predetermined time, and the overvoltage detection circuit generates the signal to stop generation of the driving signal for the switching element in a case where the first voltage comparator and the second voltage comparator determine that the voltage of the first external terminal and the voltage of the second external terminal exceed the first threshold voltage and the second threshold voltage, respectively, when the timer circuit measures a predetermined time after the switching element is turned off.

According to the above-mentioned configuration, it is determined whether or not the voltage (VDMG) of the second external terminal (DMG) exceeds the second threshold voltage (reference voltage VDMGLIM) while avoiding the period of the ringing of the voltage (VDMG) of the second external terminal (DMG) occurring immediately after the switching element is turned off, and switching control on the primary side is stopped. Therefore, it is possible to prevent the stop of switching control due to an erroneous operation.

Preferably, the insulated signal transmitter is a photocoupler, the switch is connected in series to a photodiode forming the photocoupler, and in a case where a failure is detected, the failure detection circuit turns off the switch such that a current flowing to the photodiode is cut off.

According to the above-mentioned configuration, in a case where a failure on the secondary side is detected, it is possible to reliably cut off the current flowing to the photodiode, to notify the control circuit (power supply control IC) on the primary side of the occurrence of the failure on the secondary side, and to stop the turn-on and turn-off control of the switching element.

Preferably, the switching power supply device further includes a switch that is connected between the rectification and smoothing circuit and a secondary-side output terminal, wherein the switch is turned off by the failure detection circuit when the current flowing to the insulated signal transmitter is cut off.

According to the above-mentioned configuration, in a case where a failure occurs on the secondary side, it is possible to rapidly block a path between the rectification and smoothing circuit and the output terminal.

Preferably, the rectification and smoothing circuit includes a MOS transistor as a rectification element, a synchronous rectification control circuit that controls turn-on and turn-off of the MOS transistor based on a drain voltage and a source voltage of the MOS transistor is provided on the secondary side of the transformer, the failure detection circuit is an open state detection circuit that detects an open state of a drain terminal and/or a gate terminal of the MOS transistor based on the drain voltage and the source voltage of the MOS transistor, and in a case where the open state detection circuit detects the open state, the failure detection circuit generates and outputs a signal to cut off the current flowing to the insulated signal transmitter.

According to the above-mentioned configuration, in a case where the rectification and smoothing circuit on the secondary side includes a synchronous rectification MOS transistor, it is possible to detect drain opening or gate opening, to notify the control circuit (power supply control IC) on the primary side of the drain opening or the gate opening, and to stop the turn-on and turn-off control of the switching element.

Preferably, the switching power supply device further includes a temperature detection element on the secondary side of the transformer, wherein, in a case where it is detected that temperature is equal to or greater than a predetermined value based on a signal from the temperature detection element, the failure detection circuit generates and outputs a signal to cut off the current flowing to the insulated signal transmitter.

According to the above-mentioned configuration, in a case where there is an abnormal temperature rise in the circuit on the secondary side, it is possible to detect the abnormal temperature rise, to notify the control circuit (power supply control IC) on the primary side of the abnormal temperature rise, and to stop the turn-on and turn-off control of the switching element.

Preferably, the failure detection circuit has a terminal that receives a signal notifying occurrence of a failure from an external device, and in a case where the signal notifying the occurrence of the failure is received, the failure detection circuit generates and outputs a signal to cut off the current flowing to the insulated signal transmitter.

According to the above-mentioned configuration, in a case where a load device has a failure detection function and outputs a failure detection signal, it is possible to receive the failure detection signal from the load device, to notify the control circuit (power supply control IC) on the primary side of the reception of the failure detection signal, and to stop the turn-on and turn-off control of the switching element.

According to the invention, it is possible to notify the primary side of the occurrence of a failure in a case where the failure occurs on the secondary side such that switching control is stopped, without providing a photocoupler for notifying a control circuit on the primary side of the occurrence of the failure on the secondary side, separately from a photocoupler for transmitting a feedback signal. Therefore, it is possible to prevent an increase in the number of components and an increase in mounting area and to reduce the size of a power supply device. In addition, it is possible to achieve a switching power supply device that can prevent an increase in circuit size and an increase in chip area, can be miniaturized, and does not require the use of an expensive component with a large size and a high withstand voltage in the secondary-side circuit.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE PREFERRED EMBODIMENTS

Hereinafter, preferred embodiments of the invention will be described with reference to the drawings.

Figure 1:
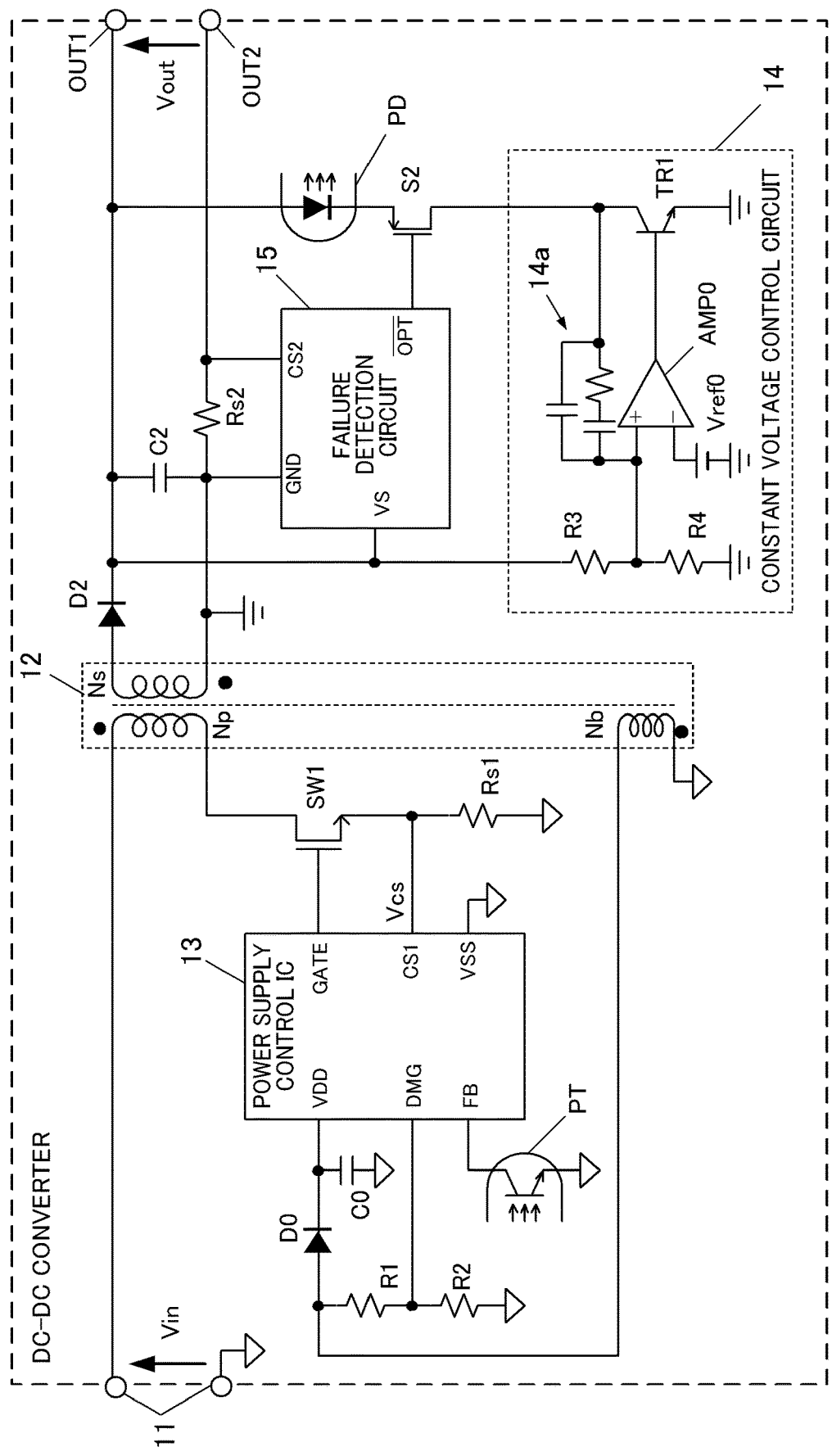
FIG. 1 is a circuit diagram illustrating an embodiment of a DC-DC converter as an effective direct-current power supply device to which a switching power supply device according to the invention is applied.

FIG. 1 is a circuit diagram illustrating an embodiment of a flyback DC-DC converter as a switching power supply device according to the invention.

The DC-DC converter according to this embodiment includes:

a pair of voltage input terminals 11 to which a direct-current voltage is input;

a voltage conversion transformer 12 having a primary winding Np, a secondary winding Ns, and an auxiliary winding Nb, a switching transistor SW1 that is connected in series to the primary winding Np of the transformer 12; and a switching power supply semiconductor device (hereinafter, referred to as a power supply control IC) 13 that turns on and off the switching transistor SW1.

In a case where an AC-DC converter is configured, a diode bridge circuit that rectifies an alternating-current voltage from an AC power supply and a smoothing capacitor are connected to a stage in front of the input terminal 11.

The switching transistor SW1 is not particularly limited. However, in this embodiment, the switching transistor SW1 is an N-channel MOSFET (insulated gate field effect transistor) and is a discrete component. The power supply control IC 13 is provided with an output terminal GATE that outputs a gate driving signal for driving a gate terminal of the switching transistor SW1.

In the DC-DC converter according to this embodiment, a rectification and smoothing circuit including a rectification diode D0 that is connected in series to the auxiliary winding Nb and a smoothing capacitor C0 that is connected between a cathode terminal of the diode D0 and a ground point GND is provided on the primary side of the transformer 12. The voltage rectified and smoothed by the rectification and smoothing circuit is applied to a power supply voltage terminal VDD. In addition, the power supply control IC 13 is provided with an external terminal DMG to which a voltage obtained by dividing the voltage induced in the auxiliary winding Nb by resistors R1 and R2 is applied.

Further, the power supply control IC 13 is provided with an external terminal FB to which a phototransistor PT forming a photocoupler for transmitting, as a feedback voltage VFB, an output detection signal on the secondary side to the primary side is connected.

Furthermore, the power supply control IC 13 is provided with an external terminal CS as a current detection terminal to which a voltage Vcs that has been subjected to current-voltage conversion by a current sense resistor Rs1 connected between a source terminal of the switching transistor SW1 and the ground point GND is input.

The following are provided on the secondary side of the transformer 12:

a rectification diode D2 that is connected in series to the secondary winding Ns;

a smoothing capacitor C2 that is connected between a cathode terminal of the diode D2 and the other terminal of the secondary winding Ns; and an output current detection resistor Rs2 that is connected between the secondary winding Ns and an output terminal OUT2.

An alternating-current voltage induced in the secondary winding Ns by the intermittent flow of a current to the primary winding Np is rectified and smoothed to generate a direct-current voltage Vout. Then, the direct-current voltage Vout is output.

In addition, the following are provided on the secondary side of the transformer 12:

a constant voltage control circuit (shunt regulator) 14 forming an output voltage detection circuit that detects the output voltage Vout;

a failure detection circuit 15 that detects a failure on the secondary side;

a photodiode PD forming a photocoupler that transmits an output voltage detection signal corresponding to the voltage detected by the constant voltage control circuit 14 to the primary side; and a MOS transistor S2 that is connected in series to the photodiode PD.

In a case where the constant voltage control circuit 14 supplies a current corresponding to the detected voltage to the photodiode PD, the current is transmitted as an optical signal with intensity corresponding to the detected voltage to the primary side. Then, a current corresponding to light intensity flows to the phototransistor PT and is converted into the voltage VFB by, for example, a pull-up resistor (Rp in FIG. 3) in the power supply control IC 13. Then, the voltage VFB is input.

The constant voltage control circuit 14 includes:

a bipolar transistor TR1 that is connected in series to the photodiode PD and the MOS transistor S2;

resistors R3 and R4 that divide the secondary-side output voltage Vout;

an error amplifier AMP0 that compares the divided voltage with a reference voltage Vref0 and outputs a voltage corresponding to a potential difference; and a phase compensation circuit 14a.

An output voltage from the error amplifier AMP0 is applied to a base terminal of the transistor TR1 and a current corresponding to the output voltage Vout flows. In this example, as the secondary-side output voltage Vout becomes higher, the amount of current flowing to the photodiode PD and the amount of current flowing to the phototransistor PT become larger. The voltage VFB of the external terminal FB of the power supply control IC 13 is reduced.

The failure detection circuit 15 has a function of outputting a signal OPT for turning off the MOS transistor S2 to cut off the current flowing to the photodiode PD in a case where the failure detection circuit 15 receives the output voltage Vout and the terminal voltage of the output current detection resistor Rs2 and detects the flow of an excessive output current that is equal to or greater than a predetermined value from the voltage between both terminals of the output current detection resistor Rs2. Similarly, the failure detection circuit 15 turns off the MOS transistor S2 in a case where it detects the application of the excessive output voltage Vout that is equal to or greater than a predetermined value on the basis of the voltage of a terminal VS.

Figure 2:
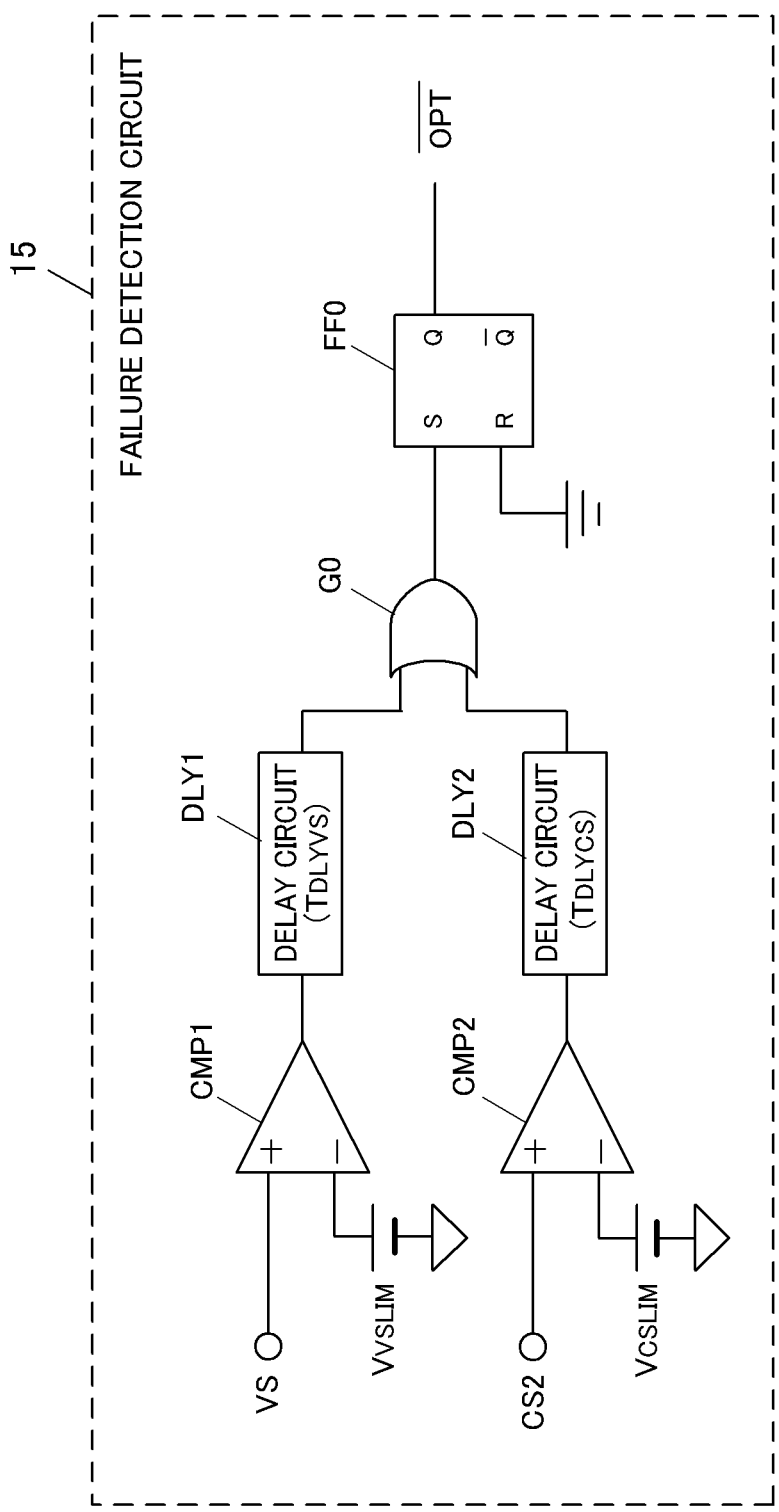
FIG. 2 is a circuit diagram illustrating an example of a failure detection circuit that is provided on a secondary side of a transformer in the DC-DC converter illustrated in FIG. 1.

FIG. 2 illustrates a specific example of the circuit configuration of the failure detection circuit 15. The failure detection circuit 15 illustrated in FIG. 2 includes a comparator CMP1 that compares the voltage of the terminal VS to which the output voltage Vout is input with a predetermined reference voltage VCSLIM and a comparator CMP2 that compares the voltage of a terminal CS2 to which the terminal voltage of the output current detection resistor Rs2 is input with a predetermined reference voltage VCSLIM (VCSLIM<VCSLIM). The resistor Rs2 with a relatively small resistance value is used in order to prevent loss caused by the resistor. Therefore, the reference voltage VCSLIM is generally set to a voltage value less than the reference voltage VCSLIM since a voltage drop caused by the flow of the output current to the resistor Rs2 is also small.

Of the comparators CMP1 and CMP2, the comparator CMP1 functions as a means for detecting an overvoltage state in which the output voltage Vout is too high and the comparator CMP2 functions as a means for detecting an overcurrent state in which the amount of output current is too large.

Further, the failure detection circuit 15 illustrated in FIG. 2 includes:

delay circuits (timer circuits) DLY1 and DLY2 that check whether the outputs of the comparators CMP1 and CMP2 are maintained for a predetermined period of time and determine the detected outputs;

an OR gate G0 that receives the output signals of the delay circuits DLY1 and DLY2 as inputs; and an RS flip-flop FF0 having a set terminal to which the output signal of the OR gate G0 is input.

An output Q of the RS flip-flop FF0 is supplied as a signal OPT to the gate terminal of the MOS transistor S2 to control the turn-on and turn-off of the MOS transistor S2.

The provision of the delay circuits DLY1 and DLY2 as described above prevents failure detection in a case where the outputs of the comparators CMP1 and CMP2 are not maintained for a predetermined period of time. Therefore, for example, it is possible to prevent a situation in which an overshoot when the output current is suddenly changed or a temporary voltage fluctuation when power is turned on (when an input voltage Vin rises) is erroneously determined as a failure (an overvoltage or an overcurrent) and the current flowing to the photodiode PD is cut off.

Next, a specific example of the circuit configuration of the power supply control IC 13 and the function of the power supply control IC 13 in this embodiment will be described with reference to FIG. 3.

Figure 3:
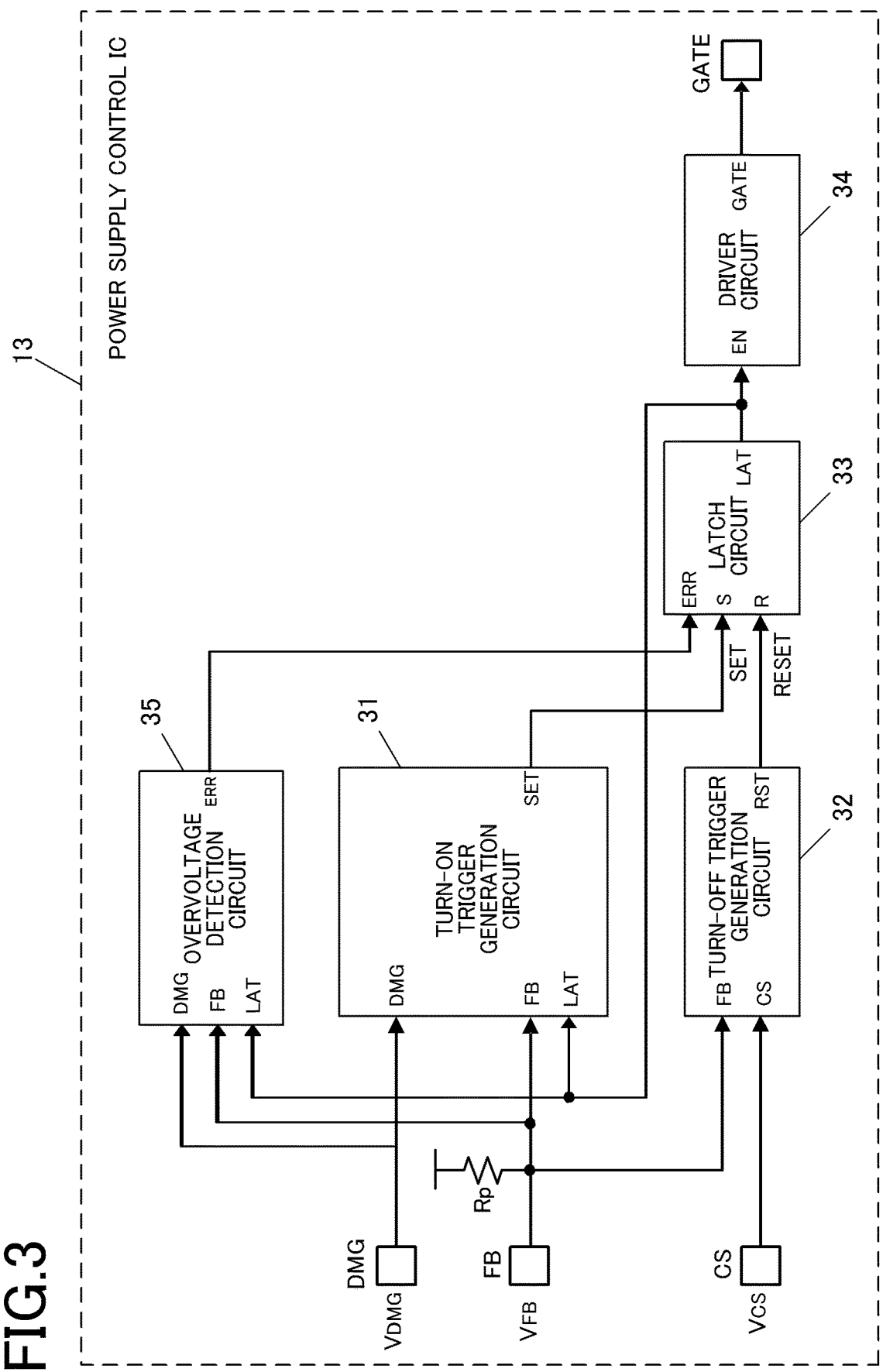
FIG. 3 is a circuit diagram illustrating an example of a switching power supply semiconductor device that is provided on a primary side of the transformer in the DC-DC converter illustrated in FIG. 1.

As illustrated in FIG. 3, the power supply control IC 13 according to this embodiment includes:

a turn-on trigger generation circuit 31 that receives the voltage of the external terminal DMG and the voltage of the external terminal FB as input voltages and generates a timing signal for turning on the switching transistor SW1;

a turn-off trigger generation circuit 32 that receives the voltage VFB of the external terminal FB and the voltage Vcs of the external terminal CS as input voltages and generates a timing signal for turning off the switching transistor SW1;

a latch circuit 33 which is, for example, an RS flip-flop receiving the output of the turn-on trigger generation circuit 31 and the output of the turn-off trigger generation circuit 32 as inputs;

a driver circuit 34 that generates a gate driving signal for driving the switching transistor SW1 according to the output of the latch circuit 33 and outputs the gate driving signal from an external terminal GATE; and an overvoltage detection circuit 35 that monitors the voltage of the external terminal DMG and the voltage of the external terminal FB and detects an overvoltage state.

In addition, the output of the latch circuit 33 is used as a signal LAT for resetting the turn-on trigger generation circuit 31.

In a case where the overvoltage detection circuit 35 detects the overvoltage state, an output ERR of the overvoltage detection circuit 35 changes to a high level and the latch circuit 33 is reset to fix the output to a low level. Then, the gate driving signal GATE output from the driver circuit 34 changes to a low level to forcibly turn off the switching transistor SW1.

In addition, in a case where the overvoltage detection circuit 35 detects the overvoltage state and the output ERR changes to the high level, the gate driving signal GATE does not change to a high level even though a turn-on trigger signal from the turn-on trigger generation circuit 31 is input to the latch circuit 33, and the switching transistor SW1 is maintained in the off state.

The turn-off trigger generation circuit 32 may be a comparator (voltage comparison circuit) CMP1 including a difference amplifier that receives the voltage Vcs of the external terminal CS and the voltage VFB of the external terminal FB as inputs. Next, a specific example and operation of each functional block will be described.

Figure 4:
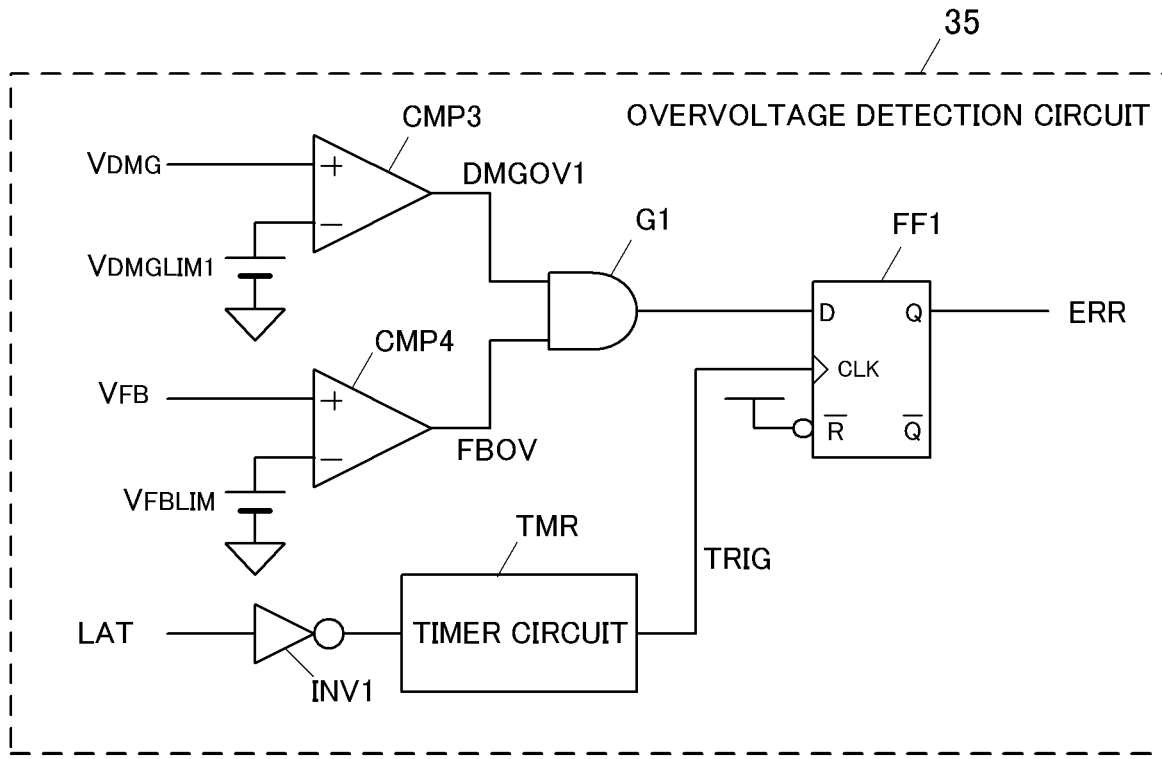
FIG. 4 is a circuit diagram illustrating a specific example of an overvoltage detection circuit forming the switching power supply semiconductor device illustrated in FIG. 3.

FIG. 4 illustrates a specific example of the circuit configuration of the overvoltage detection circuit 35.

As illustrated in FIG. 4, the overvoltage detection circuit 35 includes:

a comparator CMP3 that compares a voltage (a voltage proportional to an auxiliary-winding-induced voltage) VDMG of the external terminal DMG with a predetermined reference voltage VDMGLIM;

a comparator CMP4 that compares the voltage VFB of the external terminal FB with a predetermined reference voltage VFBLIM;

an AND gate G1 that receives the outputs of the comparators CMP3 and CMP4 as inputs;

a D-type flip-flop FF1 that receives the output of the AND gate G1; and an inverter INV1 that inverts the output LAT of the latch circuit 33.

Further, the overvoltage detection circuit 35 includes a timer circuit TMR that outputs a signal TRIG which rises with a time delay of, for example, 2 μs with respect to the falling of the signal LAT in order to avoid the ringing of the reflected voltage of the external terminal DMG. The flip-flop FF1 receives the output of the AND gate G1, using the output signal of the timer circuit TMR as a clock signal. Then, the output of the flip-flop FF1 is supplied as a switching stop signal ERR to the latch circuit 33.

According to the overvoltage detection circuit 35 of this example, the voltage of the auxiliary winding (which is proportional to the output voltage) at which switching control is stopped can be easily set by appropriately setting the voltage division ratio of the resistors R1 and R2 externally attached to the external terminal DMG.

Figure 5:
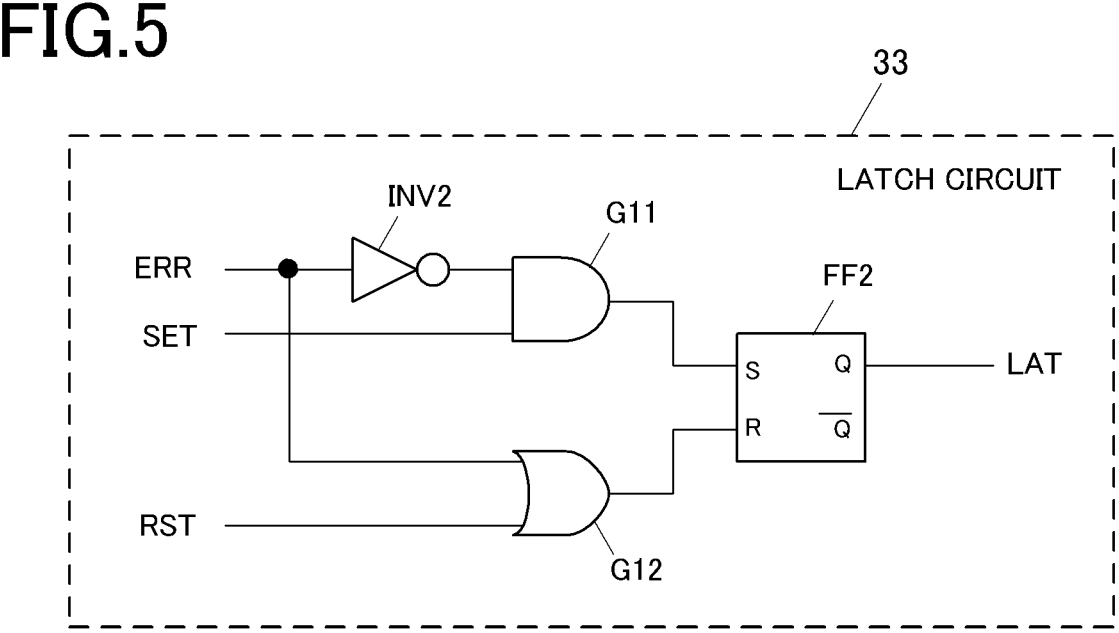
FIG. 5 is a circuit diagram illustrating a specific example of a latch circuit forming the switching power supply semiconductor device illustrated in FIG. 3.

FIG. 5 illustrates a specific example of the circuit configuration of the latch circuit 33.

As illustrated in FIG. 5, the latch circuit 33 includes: an inverter INV2 that inverts the output ERR of the overvoltage detection circuit 35;

an AND gate G11 that receives the output of the inverter INV2 and the output of the turn-on trigger generation circuit 31 as inputs;

an OR gate G12 that receives the output of the overvoltage detection circuit 35 and the output of the turn-off trigger generation circuit 32 as inputs; and an RS flip-flop FF2 that receives the output of the AND gate G11 and the output of the OR gate G12 as inputs.

In the latch circuit 33, in a case where the output ERR of the overvoltage detection circuit 35 changes to a high level, the RS flip-flop FF2 is reset through the OR gate G12 and the output of the latch circuit 33 changes to a low level. Then, the gate driving signal GATE output from the driver circuit 34 in the stage behind the latch circuit 33 changes to a low level and the switching transistor SW1 is turned off. In a case where the output ERR of the overvoltage detection circuit 35 changes to a high level, the output of the AND gate G11 is fixed to a low level. Then, even in a case where the output SET of the turn-on trigger generation circuit 31 rises, the RS flip-flop FF2 is not set, that is, the switching transistor SW1 is not turned on.

Figure 6:
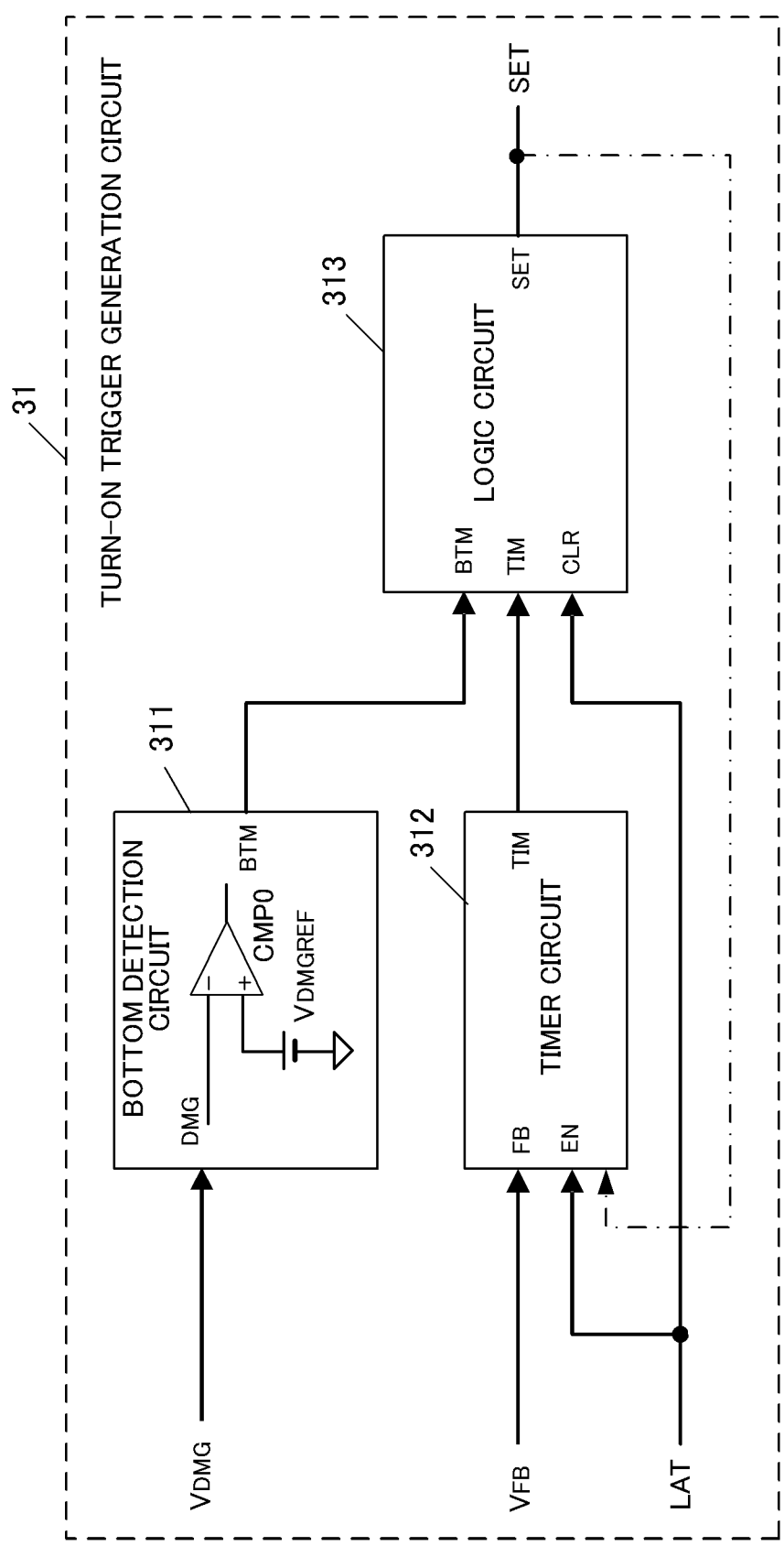
FIG. 6 is a circuit diagram illustrating a specific example of a turn-on trigger generation circuit forming the switching power supply semiconductor device illustrated in FIG. 3.

FIG. 6 illustrates a specific example of the circuit configuration of the turn-on trigger generation circuit 31.

As illustrated in FIG. 6, the turn-on trigger generation circuit 31 includes:

a bottom detection circuit 311 that detects the lowest voltage point of the external terminal DMG;

a timer circuit 312 that receives the voltage VFB of the external terminal FB as an input and measures a predetermined time; and a logic circuit 313 that receives an output BTM of the bottom detection circuit 311, an output TIM of the timer circuit 312, and the output LAT of the latch circuit 33 as inputs.

Among these circuits, the bottom detection circuit 311 may include a comparator (CMP0) that compares the voltage (a voltage proportional to the auxiliary-winding-induced voltage) VDMG of the external terminal DMG with a reference voltage VDMGREF ($\approx 0$ V) and performs an inverting operation in the phase of the zero current resonance characteristics of the auxiliary winding.

The timer circuit 312 operates using the output LAT of the latch circuit 33 as a trigger signal and measures a time Ta corresponding to the voltage VFB of the external terminal FB. The logic circuit 313 operates using the output LAT of the latch circuit 33 as a circuit clear signal. That is, in a case where the output LAT of the latch circuit 33 changes to a high level, the timer circuit 312 starts an operation of measuring the time Ta corresponding to the voltage VFB of the external terminal FB. In a case where the output LAT of the latch circuit 33 changes to the high level, the output SET of the logic circuit 313 changes to a low level. In addition, the timer circuit 312 may be configured so as to operate using the output SET of the logic circuit 313 as a trigger signal, instead of the output LAT of the latch circuit 33, as represented by a one-dot chain line.

Figure 7:
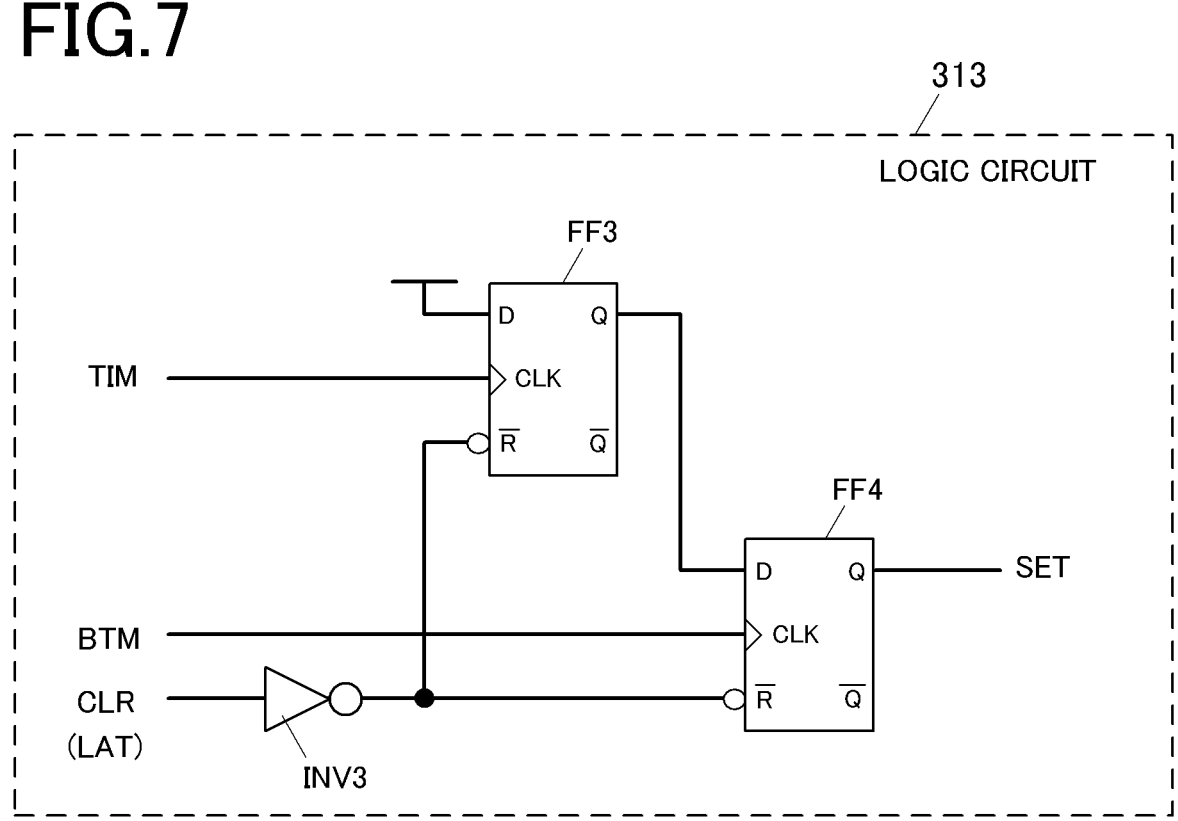
FIG. 7 is a circuit diagram illustrating a specific example of a logic circuit forming the turn-on trigger generation circuit illustrated in FIG. 6.

FIG. 7 illustrates a specific example of the circuit configuration of the logic circuit 313.

As illustrated in FIG. 7, the logic circuit 313 includes:

a D-type flip-flop FF3 having a clock terminal to which the output signal TIM of the timer circuit 312 is input;

a D-type flip-flop FF4 that latches the output of the flip-flop FF3, using the output BTM of the bottom detection circuit 311 as a clock signal; and an inverter INV3 that inverts the output LAT of the latch circuit 33.

The output of the inverter INV3 is input as a reset signal of the flip-flops FF3 and FF4 to the flip-flops FF3 and FF4.

Figure 8:
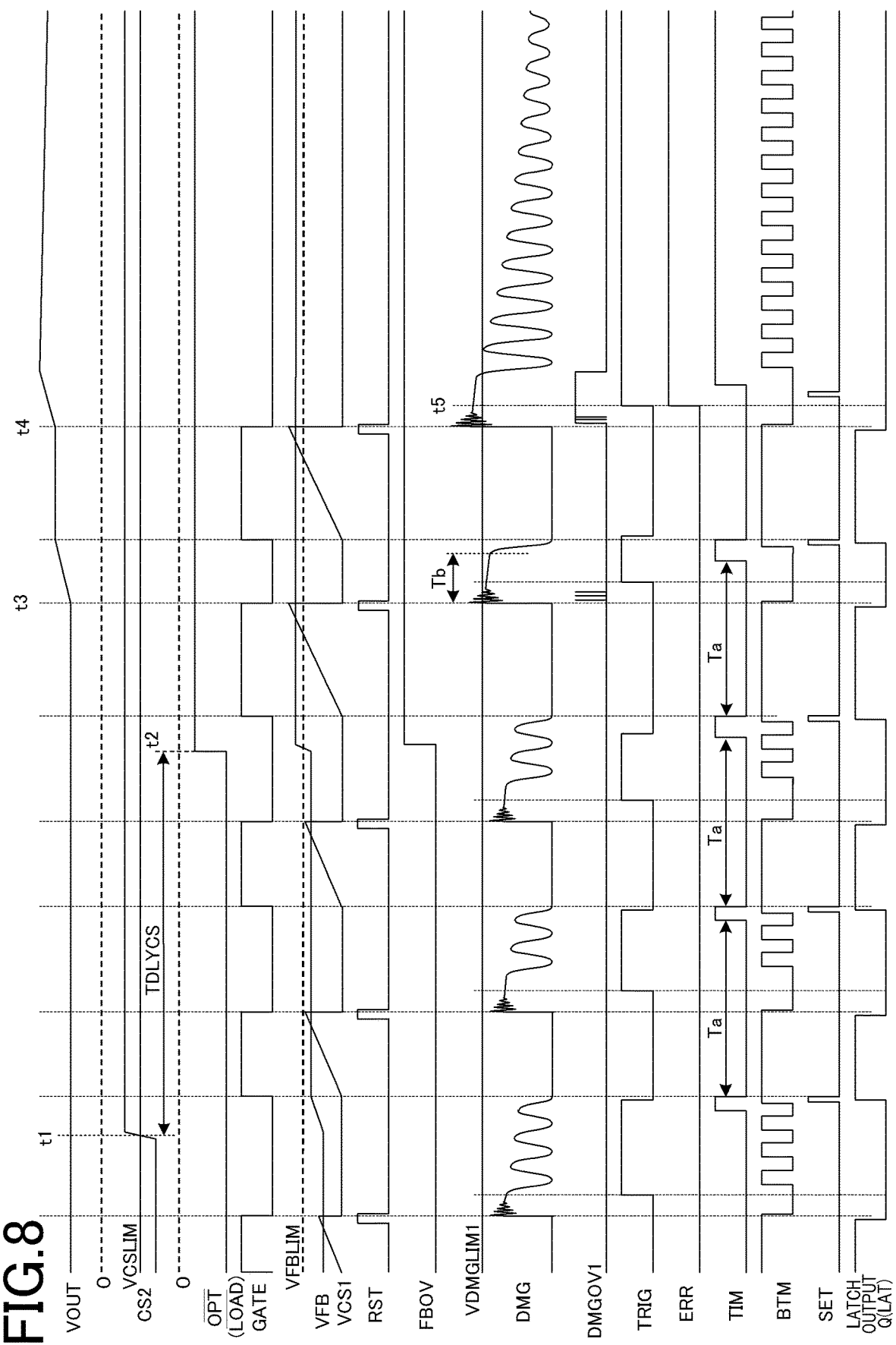
FIG. 8 is a timing chart illustrating the waveforms of signals of the switching power supply semiconductor device according to the example in a case where an initial output voltage is low.
Figure 9:
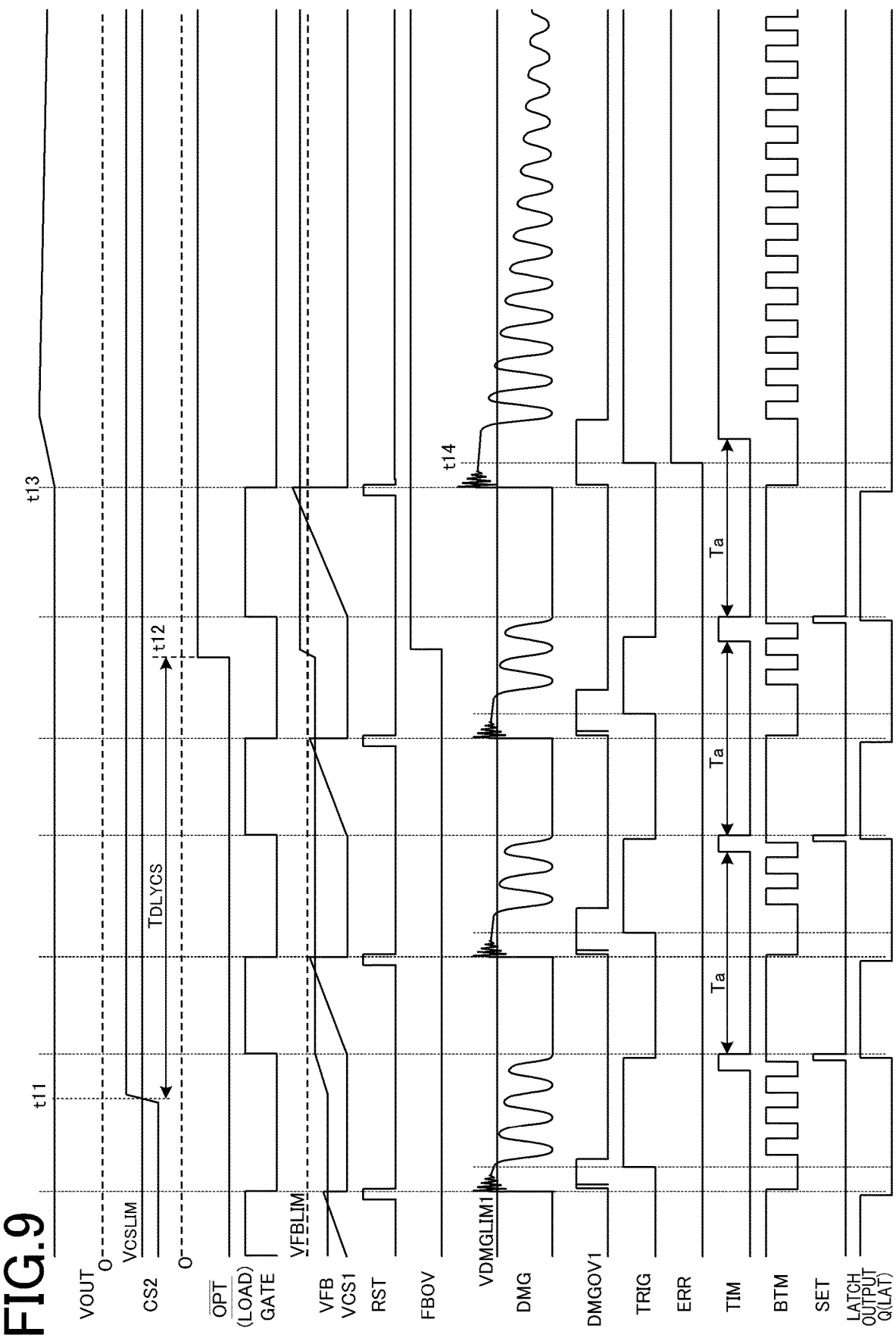
FIG. 9 is a timing chart illustrating the waveforms of the signals of the switching power supply semiconductor device according to the example in a case where the initial output voltage is high.

Next, the operation of the DC-DC converter having the above-mentioned configuration will be described with reference to timing charts illustrated in FIGS. 8 and 9. FIG. 8 illustrates the waveforms of the signals of each unit of the DC-DC converter in a case where an overcurrent occurs in a state in which the secondary-side initial output voltage is low and FIG. 9 illustrates the waveforms of the signals of each unit in a case where an overcurrent occurs in a state in which the secondary-side initial output voltage is high. The power supply control IC 13 according to this embodiment can operate in a PWM mode or a quasi-resonance mode, which will be described below. However, in both cases of FIGS. 8 and 9, the switching power supply semiconductor device operates in the quasi-resonance mode. In addition, the operation in the quasi-resonance mode is mainly implemented by the function of the turn-on trigger generation circuit 31.

In FIG. 8, for example, in a case where a short-circuit occurs in a secondary-side load at a timing t1 and the amount of output current increases, the voltage drop of the output current detection resistor Rs2 increases due to the increase in the amount of output current, and the voltage of the input terminal CS2 of the failure detection circuit 15 rises. Then, after the delay time TDLYCS of the delay circuit DLY2 (see FIG. 2) elapses, the output of the comparator CMP2 changes from a low level to a high level and the output/OPT of the failure detection circuit 15 changes to a high level (timing t2). Then, the current switch S2 is turned off and the current of the photodiode PD is cut off. The voltage VFB of the external terminal FB of the power supply control IC 13 rises and an output FBOV of the comparator CMP4 of the overvoltage detection circuit 35 changes to a high level.

The amount of current of the primary winding increases due to the rise of the voltage VFB of the external terminal FB and the output voltage Vout rises. Therefore, the peak voltage of the voltage VDMG of the external terminal DMG of the power supply control IC 13 rises and exceeds the reference voltage VDMGLIM. Then, the output DMGOV1 of the comparator CMP3 of the overvoltage detection circuit 35 changes to a high level (timings t3 and t4). Then, when a predetermined delay time (2 μS) elapses after the output LAT (gate driving signal GATE) of the latch circuit 33 changes to a low level, the output TRIG of the timer circuit TMR1 of the overvoltage detection circuit 35 rises. In a case where the output DMGOV1 is at a high level, the output ERR of the overvoltage detection circuit 35 changes to a high level (timing t5).

Then, the output Q(LAT) of the latch circuit 33 changes to a low level and the gate driving signal GATE output from the driver circuit 34 changes to a low level. Therefore, the switching transistor SW1 is turned off. In a case where the output Q(LAT) of the latch circuit 33 changes to the low level, the time measurement operation of the timer circuit 312 is stopped. The time (2 μS) measured by the timer circuit TMR of the overvoltage detection circuit 35 is set to avoid the period for which the voltage VDMG of the external terminal DMG is ringing. In a case where this period can be removed, the time is not limited to 2 μS and can be freely set within the range of a time Tb before the voltage VDMG falls.

In contrast, as illustrated in FIG. 9, in a case where an overcurrent occurs in a state in which the secondary-side initial output voltage is high, the peak voltage of the voltage VDMG of the external terminal DMG already exceeds the reference voltage VDMGLIM at the time (timing t11) when the overcurrent occurs (however, the switching operation is continuously performed since a source-drain voltage VDS of the switching transistor SW1 does not exceed the limit). Therefore, after the delay time TDLYCS of the delay circuit DLY2 of the failure detection circuit 15 on the secondary side elapses, the output of the comparator CMP2 changes from a low level to a high level (timing t12) and the current of the photodiode PD is cut off. The voltage VFB of the external terminal FB of the power supply control IC 13 rises and the output FBOV of the comparator CMP4 of the overvoltage detection circuit 35 changes to a high level.

Then, when the voltage VDMG of the external terminal DMG of the power supply control IC 13 exceeds the reference voltage VDMGLIM, the output DMGOV1 of the comparator CMP3 of the overvoltage detection circuit 35 changes to a high level (timing t13). When the time (2 μS) measured by the timer circuit TMR elapses, the output TRIG of the timer circuit TMR of the overvoltage detection circuit 35 rises. At that time, since the output DMGOV1 is at the high level, the output ERR of the overvoltage detection circuit 35 changes to a high level (timing t14). Then, the output Q(LAT) of the latch circuit 33 changes to a low level and the gate driving signal GATE output from the driver circuit 34 changes to a low level. The switching transistor SW1 is turned off and the overvoltage protection function works.

In this example, switching control is immediately stopped when the voltage VDMG of the external terminal DMG exceeds the reference voltage VDMGLIM first after the current of the photodiode PD is cut off and the feedback voltage VFB of the power supply control IC 13 rises. Therefore, there is an advantage that the rise of the secondary-side output voltage in the overvoltage protection operation is small, that is, the difference between the secondary-side output voltage in the overvoltage protection operation and the secondary-side output voltage in a normal operation is small and it is not necessary to use an expensive component with a large size and a high withstand voltage in the secondary-side circuit. In addition, in a case where the current of the photodiode PD is cut off, the feedback voltage VFB rises. At that time, in most cases, the power supplied to the secondary side by switching control is higher than the output power. Therefore, the output voltage Vout rises. At the same time, the voltage VDMG of the external terminal DMG of the power supply control IC 13 also rises. That is, in this example, the voltage VDMG of the external terminal DMG is intentionally raised.

As can be seen from the above description, in the DC-DC converter according to the above-described embodiment, in a case where an overcurrent occurs on the secondary side, the current of the photodiode PD is cut off. On the primary side, the switching transistor SW1 is turned off and the protection function that maintains the off state is activated. In addition, in a case where an overvoltage occurs on the secondary side, the output of the comparator CMP1 changes from a low level to a high level after the delay time TDLYVS of the delay circuit DLY1 of the failure detection circuit 15 on the secondary side elapses, and the current of the photodiode PD is cut off. Therefore, the overvoltage detection circuit 35 in the power supply control IC 13 on the primary side detects the occurrence of a failure on the secondary side with the same operation as described above. The gate driving signal GATE output from the driver circuit 34 changes to a low level and the switching transistor SW1 is turned off. The protection function that maintains the off state is activated.

MODIFICATION EXAMPLES

Next, modification examples of the DC-DC converter according to the above-described embodiment will be described.

FIGS. 10A to 14 illustrate modification examples of the secondary-side circuit. In the modification example illustrated in FIG. 10A among FIGS. 10A to 14, a load switch S3 which is a P-channel MOS transistor is provided between a rectification and smoothing circuit (D2 and C2) on the secondary side and the output terminal OUT1, and the failure detection circuit 15 is provided with a terminal /LOAD from which a signal for controlling the turn-on and turn-off of the load switch S3 is output. The signal output from the terminal /LOAD has the same phase as the signal /OPT for controlling the turn-on and turn-off of the current switch S2 (P-channel MOS transistor) that is connected in series to the photodiode PD. The load switch S3 is configured so as to be turned off in synchronization with the cut-off of the current of the photodiode PD by the turn-off of the current switch S2.

Figure 10A:
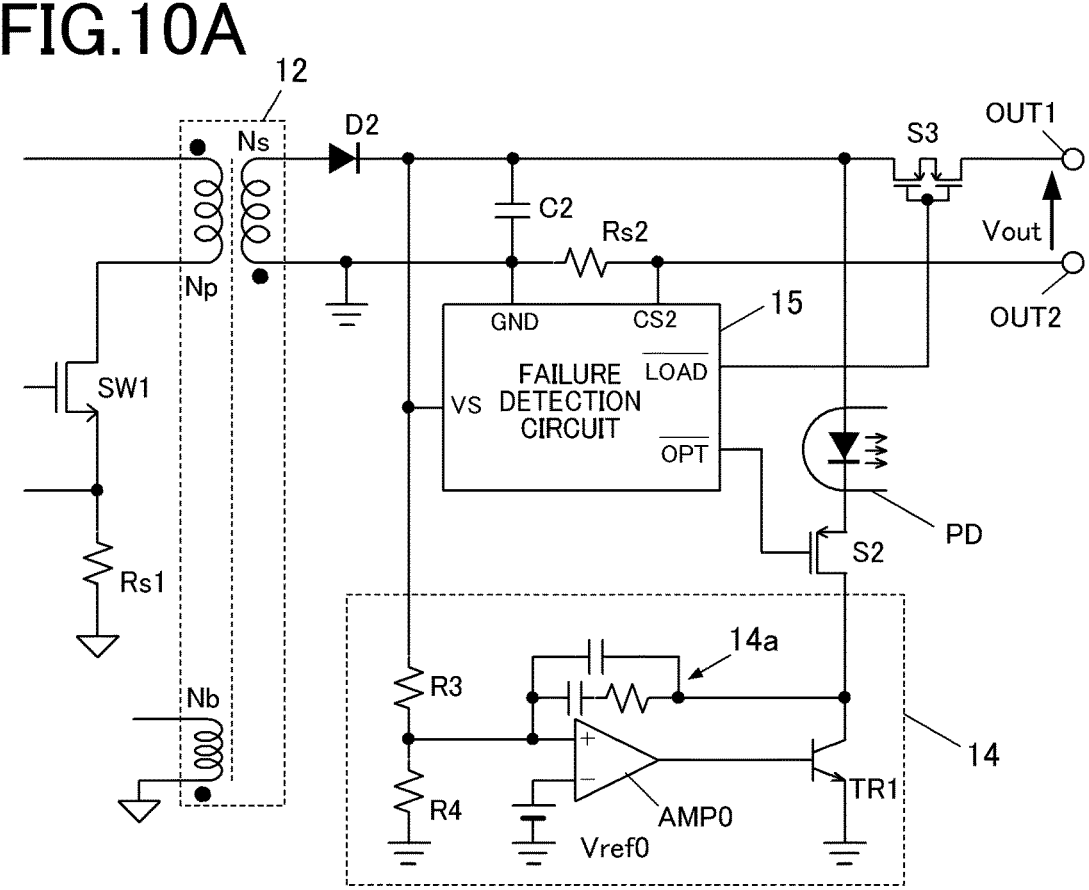
FIG. 10A is a circuit diagram illustrating another example of the circuits on the secondary side.
Figure 10B:
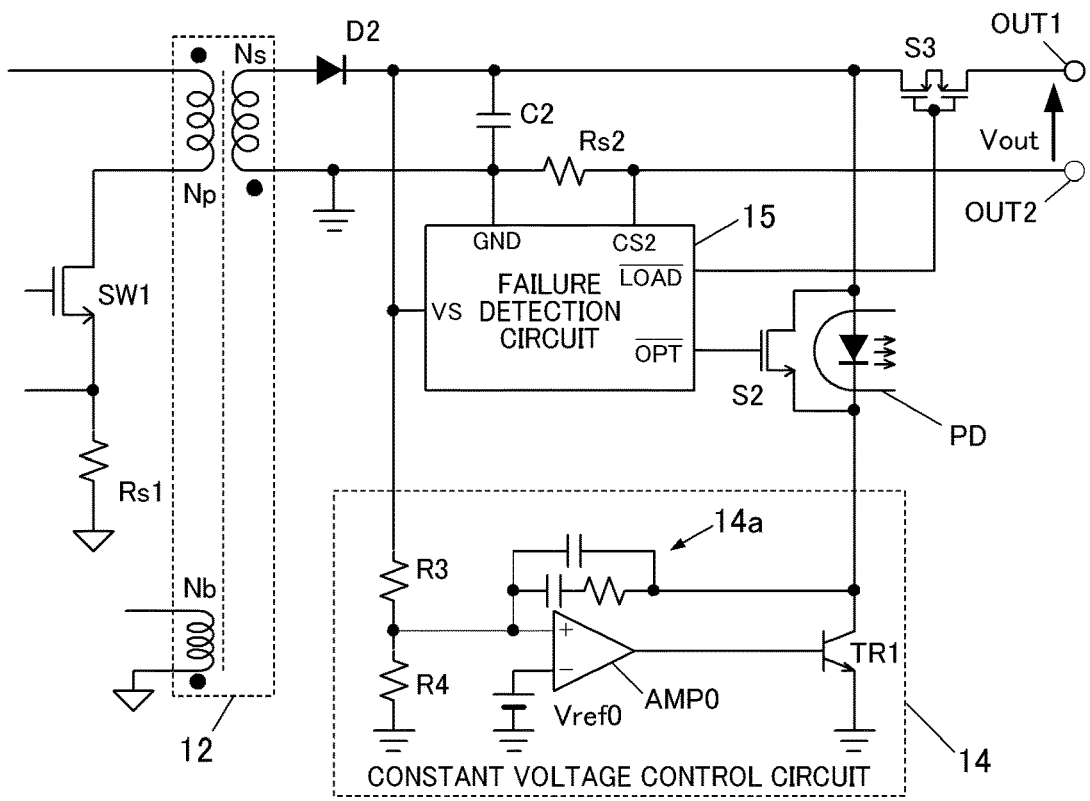
FIG. 10B is a circuit diagram illustrating still another example of the circuits on the secondary side.

In the modification example illustrated in FIG. 10B, the load switch S3 is provided and the current switch S2 is connected in parallel to the photodiode PD. In the modification example, a signal for controlling the turn-on and turn-off of the load switch S3 is almost the same (same phase) as the signal /OPT for controlling the turn-on and turn-off of the current switch S2 (N-channel MOS transistor). In general, the current switch S2 is turned off such that a current flows to the photodiode PD. In contrast, in a case where a failure is detected, the current switch S2 is turned on to cut off the current of the photodiode PD and the load switch S3 is turned off in synchronization with the cut-off of the current. In addition, for example, the signal /LOAD for turning on or off the load switch S3 can be output by providing a driver circuit that generates a signal with the same phase as the output Q of the RS flip-flop FF0 forming the failure detection circuit 15 illustrated in FIG. 2.

Figure 11:
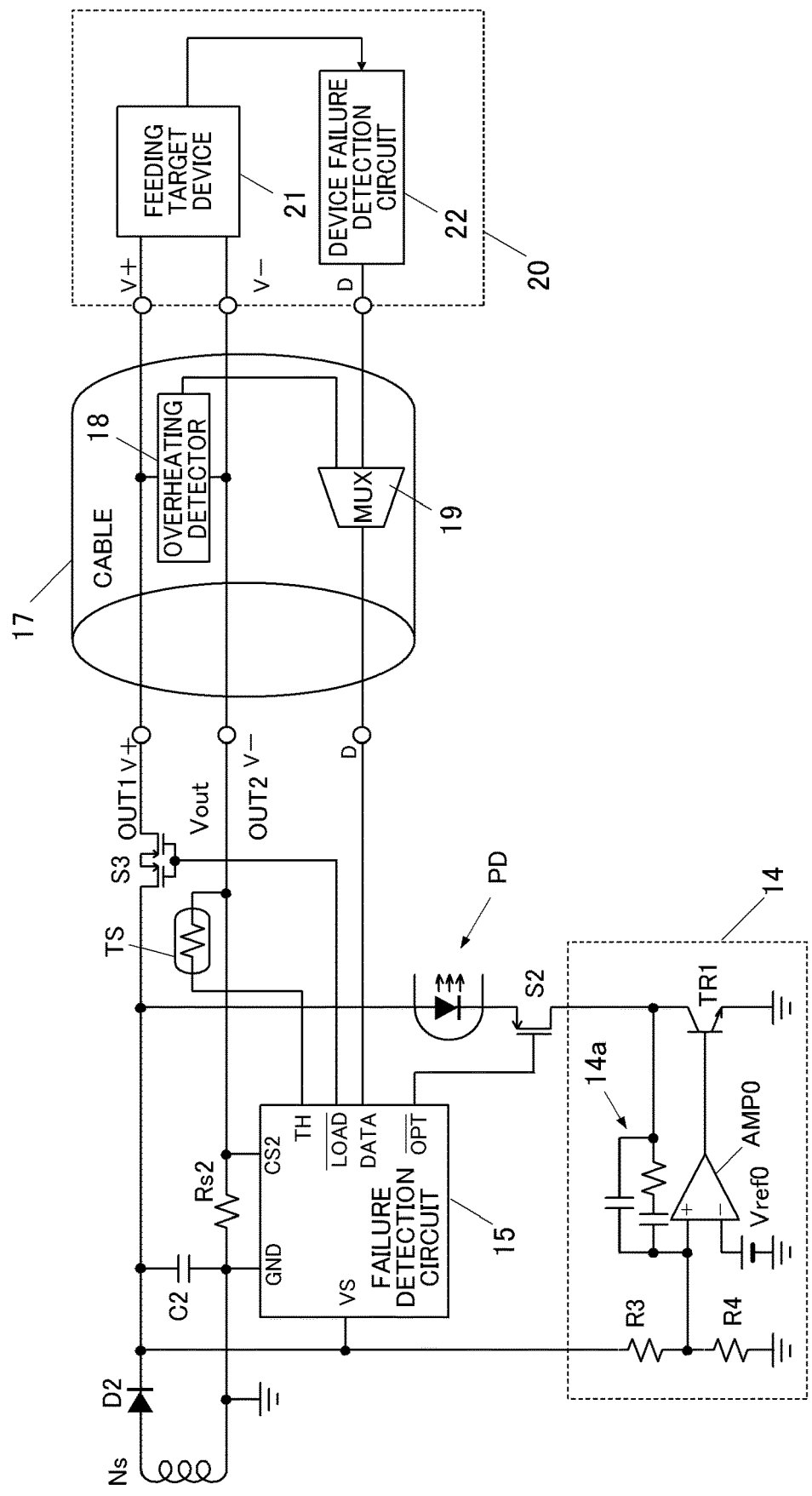
FIG. 11 is a circuit diagram illustrating yet another example of the circuits on the secondary side.

The modification example illustrated in FIG. 11 differs from the modification example illustrated in FIG. 10A in that a temperature sensor (thermistor) TS which detects the temperature of the secondary-side circuit (particularly, the vicinity of the load switch) is provided and the failure detection circuit 15 has a terminal TH to which the temperature sensor TS is connected and a circuit which monitors the voltage of the terminal TH to determine whether the temperature is abnormal. In addition, in this modification example, an overheating detector 18 is provided in a cable 17 for connecting a load device 20 to the secondary-side output terminals OUT1 and OUT2. Further, in a case where a device failure detection circuit 22 is provided in the load device 20, a multiplexer 19 that combines an error signal from the device failure detection circuit 22 and a signal detected by the overheating detector 18 is provided, and the failure detection circuit 15 is provided with a terminal DATA for receiving the output signal of the multiplexer 19.

Figure 12:
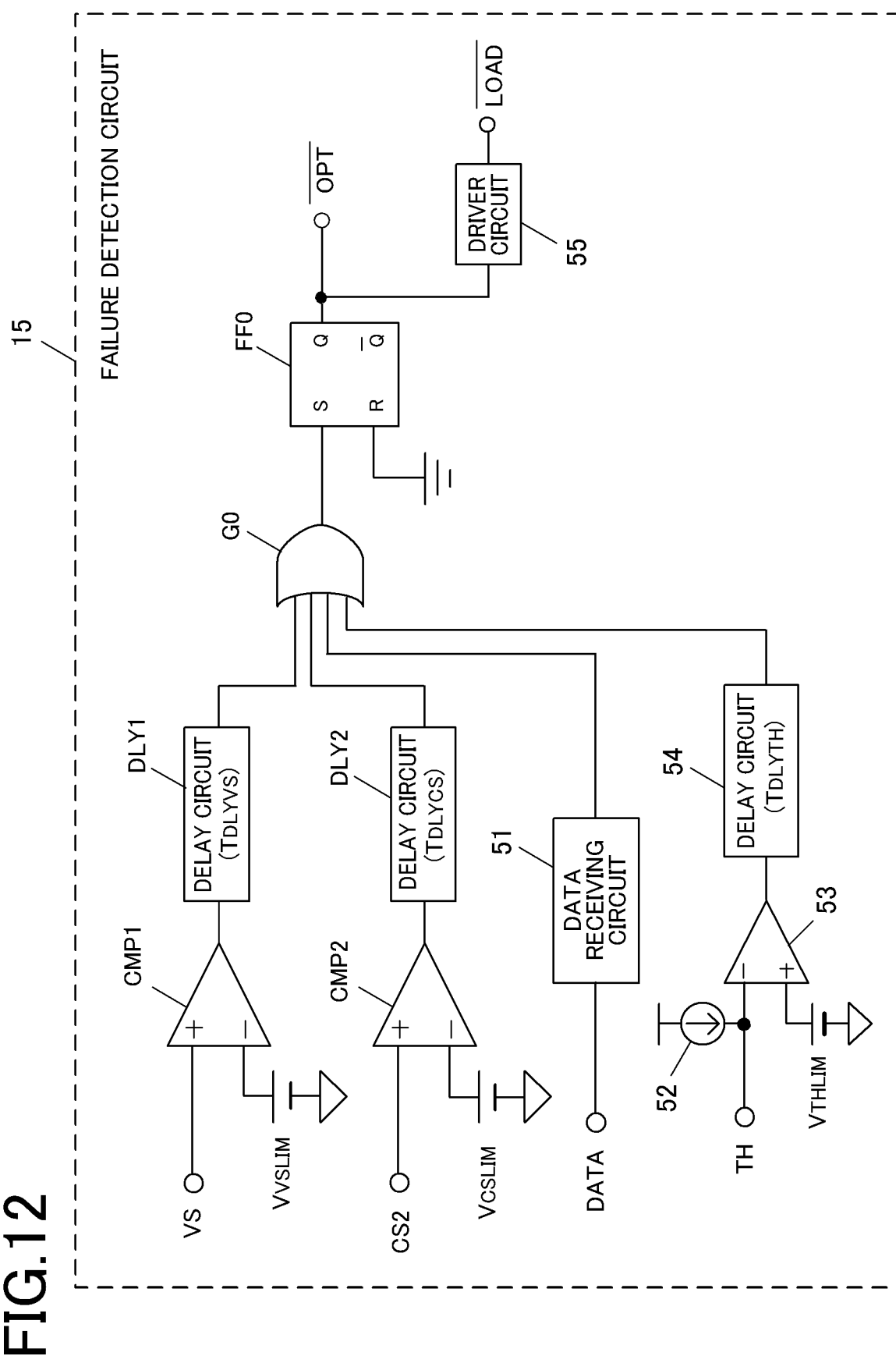
FIG. 12 is a circuit diagram illustrating a specific example of a failure detection circuit provided on the secondary side in the example illustrated in FIG. 11.

FIG. 12 illustrates an example of the configuration of the failure detection circuit 15 according to the modification example illustrated in FIG. 11.

In addition to the circuits (CMP1, CMP2, DLY1, DLY2, G0, and FF0) forming the failure detection circuit 15 illustrated in FIG. 2, the failure detection circuit 15 according to this modification example includes:

a data receiving circuit 51 that receives a signal input to the terminal DATA;

a constant current source 52 that is connected to the terminal TH connected to the temperature sensor TS;

a comparator 53 that compares the voltage of the terminal TH with a predetermined reference voltage VTHLIM;

a delay circuit 54 that delays the output of the comparator 53; and a driver circuit 55 that generates a signal /LOAD having the same phase as the output Q of the RS flip-flop FF0.

Figure 13:
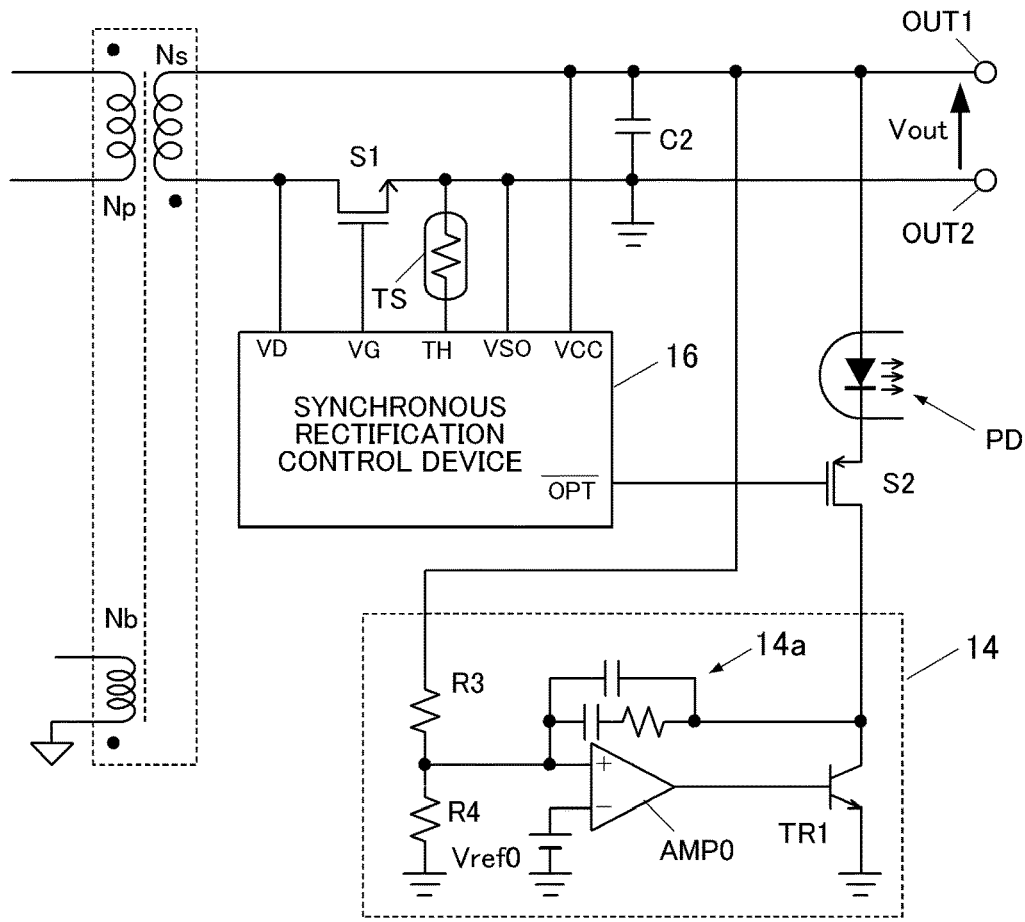
FIG. 13 is a circuit diagram illustrating still yet another example of the circuits on the secondary side.

In the modification example illustrated in FIG. 13, a synchronous rectification switch S1 which is a MOS transistor is provided as a secondary-side rectification means instead of the diode D2. A synchronous rectification control device (IC) 16 is provided instead of the failure detection circuit 15. A temperature sensor (thermistor) TS that detects the temperature of the secondary-side circuit (particularly, the vicinity of the synchronous rectification switch) is provided. The synchronous rectification control device 16 has a failure detection function.

Figure 14:
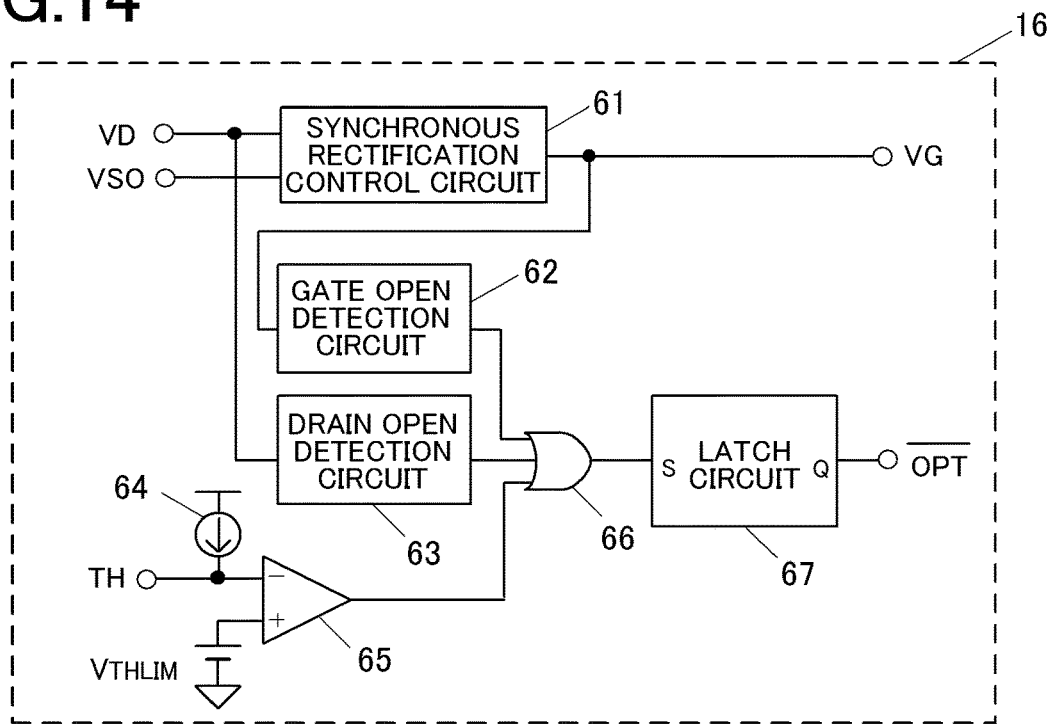
FIG. 14 is a circuit diagram illustrating a specific example of a synchronous rectification control device provided on the secondary side in the example illustrated in FIG. 13.

FIG. 14 illustrates an example of the configuration of the synchronous rectification control device 16.

As illustrated in FIG. 14, the synchronous rectification control device 16 includes:

terminals VD, VG, and VSO that are connected to a drain terminal, a gate terminal, and a source terminal of the synchronous rectification switch S1, respectively;

a synchronous rectification control circuit 61 that detects the timing when the synchronous rectification switch S1 is turned on or off on the basis of the potential of the terminals VD and VSO, generates a gate voltage, and outputs the gate voltage to the terminal VG;

a gate open detection circuit 62 that detects gate opening (disconnection) on the basis of the potential of the terminal VG; and a drain open detection circuit 63 that detects drain opening (disconnection) on the basis of the potential of the terminal VD.

In addition, the synchronous rectification control device 16 includes:

a terminal TH to which the temperature sensor TS is connected;

a constant current source 64 connected to the terminal TH;

a comparator 65 that compares the voltage of the terminal TH with a predetermined reference voltage VTHLIM;

an OR gate 66 that receives the output of the comparator 65, the output of the gate open detection circuit 62, and the output of the drain open detection circuit 63 as inputs; and a latch circuit 67 that latches the output of the OR gate 66.

The output of the latch circuit 67 is output as a signal /OPT for controlling the turn-on and turn-off of the current switch S2 connected in series to the photodiode PD.

Furthermore, the synchronous rectification control device 16 may be provided with a terminal (DATA in FIG. 11) for receiving a signal indicating the occurrence of a failure from an external device and may generate and output a signal /OPT for cutting off the flow of a current to the photodiode PD in a case where the signal indicating the occurrence of a failure is received. The load switch S3 may be provided in the circuit according to the modification example illustrated in FIG. 13, and the synchronous rectification control device 16 may be configured to have a function of generating a signal for controlling the turn-on and turn-off of the load switch S3.

Figure 15:
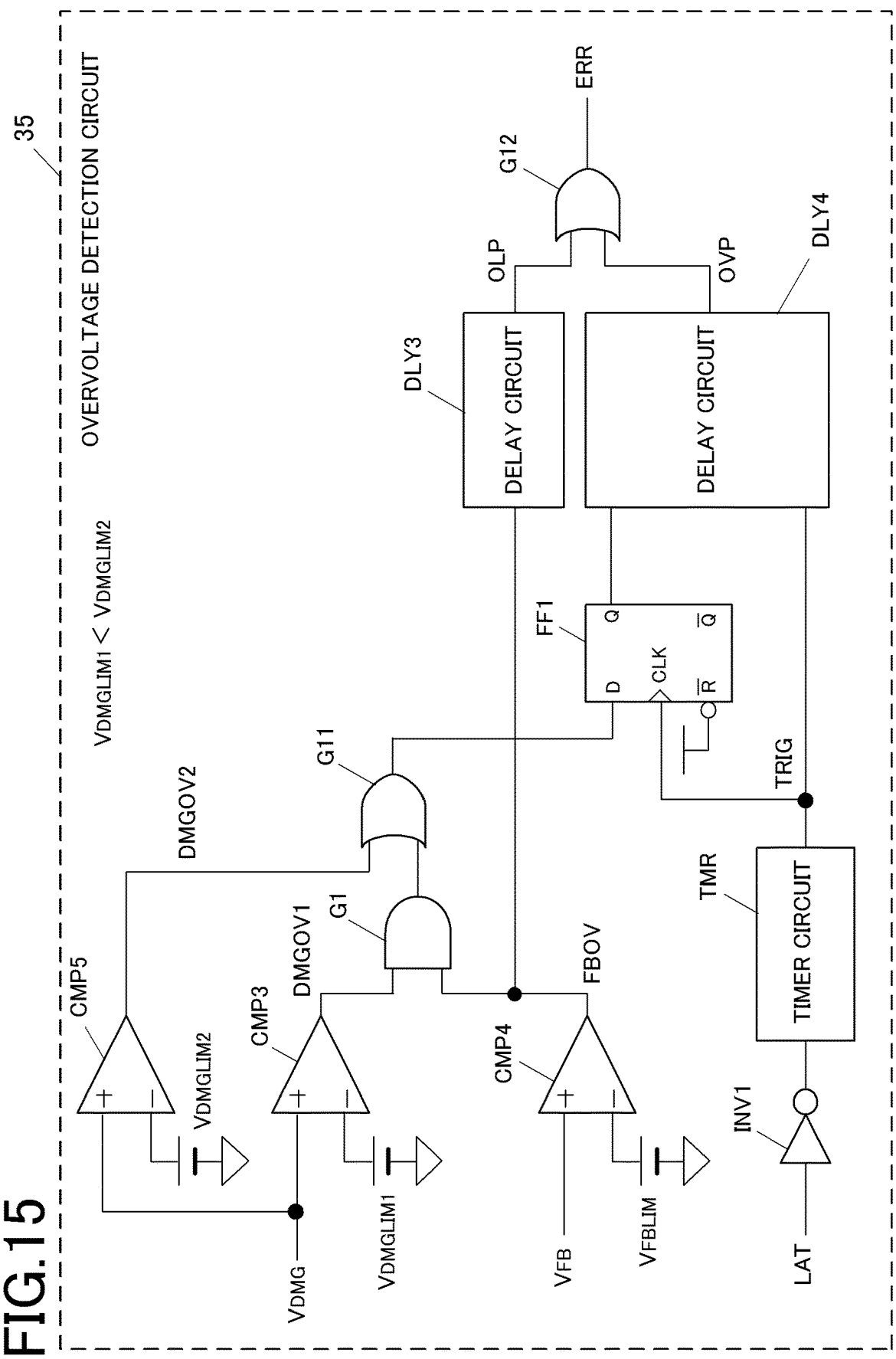
FIG. 15 is a circuit diagram illustrating a modification example of an overvoltage detection circuit forming the switching power supply semiconductor device according to the example illustrated in FIG. 3.
Figure 16:
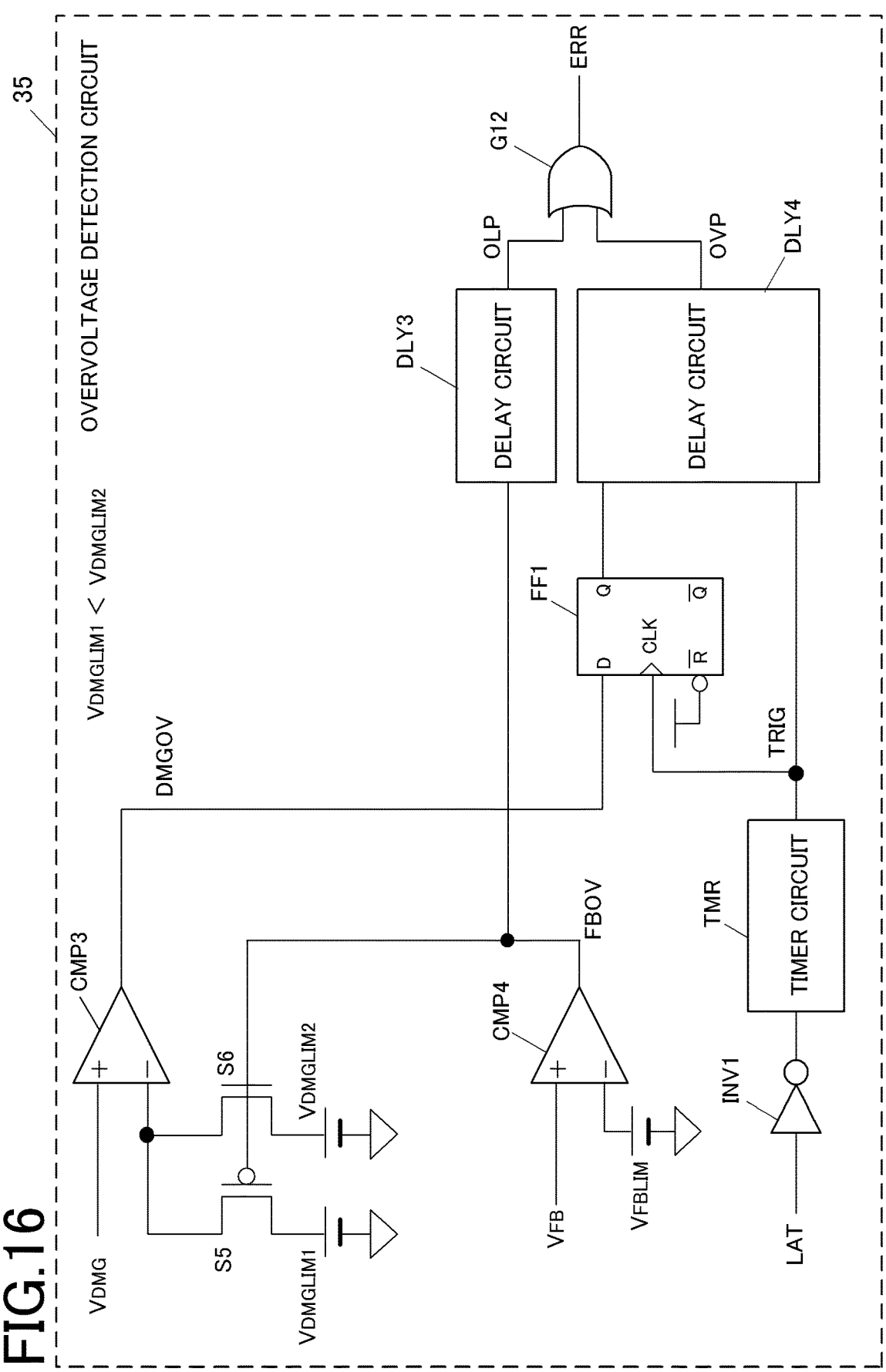
FIG. 16 is a circuit diagram illustrating another modification example of the overvoltage detection circuit.

FIGS. 15 and 16 illustrate other examples of the configuration of the overvoltage detection circuit 35 provided in the power supply control IC 13.

In the examples, the overvoltage detection circuit 35 illustrated in FIG. 15 differs from the overvoltage detection circuit 35 illustrated in FIG. 4 in that it further includes:

a comparator CMP5 which compares the voltage VDMG of the external terminal DMG with a predetermined reference voltage VDMGLIM2 (>VDMGLIM1);

an OR gate G11 that receives the output of the comparator CMP5 and the output of the AND gate G1 as inputs;

a delay circuit DLY3 that delays the output of the comparator CMP4 by about 10 ms to 500 ms;

a delay circuit DLY4 that delays the output of the D-type flip-flop FF1 by about 10 µS to 200 µS or a counter circuit that counts the output TRIG of the timer circuit TMR; and an OR gate G12 that receives the outputs OLP and OVP of the delay circuits DLY3 and DLY4 as inputs and outputs a failure signal ERR.

Further, the D-type flip-flop FF1 receives the output of the OR gate G11, using the output TRIG of the timer circuit TMR as a clock signal. The comparator CMP5 is provided for a DMG overvoltage protection function that works regardless of the voltage VFB of the external terminal FB. The comparator CMP4, the delay circuit DLY3, and the OR gate G12 implement an overload protection function that works regardless of the voltage VDMG of the external terminal DMG.

The overvoltage detection circuit 35 illustrated in FIG. 16 includes MOS transistors S5 and S6 for selectively supplying the reference voltage VDMGLIM2 or VDMGLIM1 to an inverting input terminal of the comparator CMP3, instead of adding the comparator CMP5 and the OR gate G11 as in the overvoltage detection circuit 35 illustrated in FIG. 15. One of the MOS transistors S5 and S6 is turned on by the output of the comparator CMP4 and the other MOS transistor is turned off by the output of the comparator CMP4. The operation and function of the circuit are the same as those in the overvoltage detection circuit 35 illustrated in FIG. 15.

Figure 17:
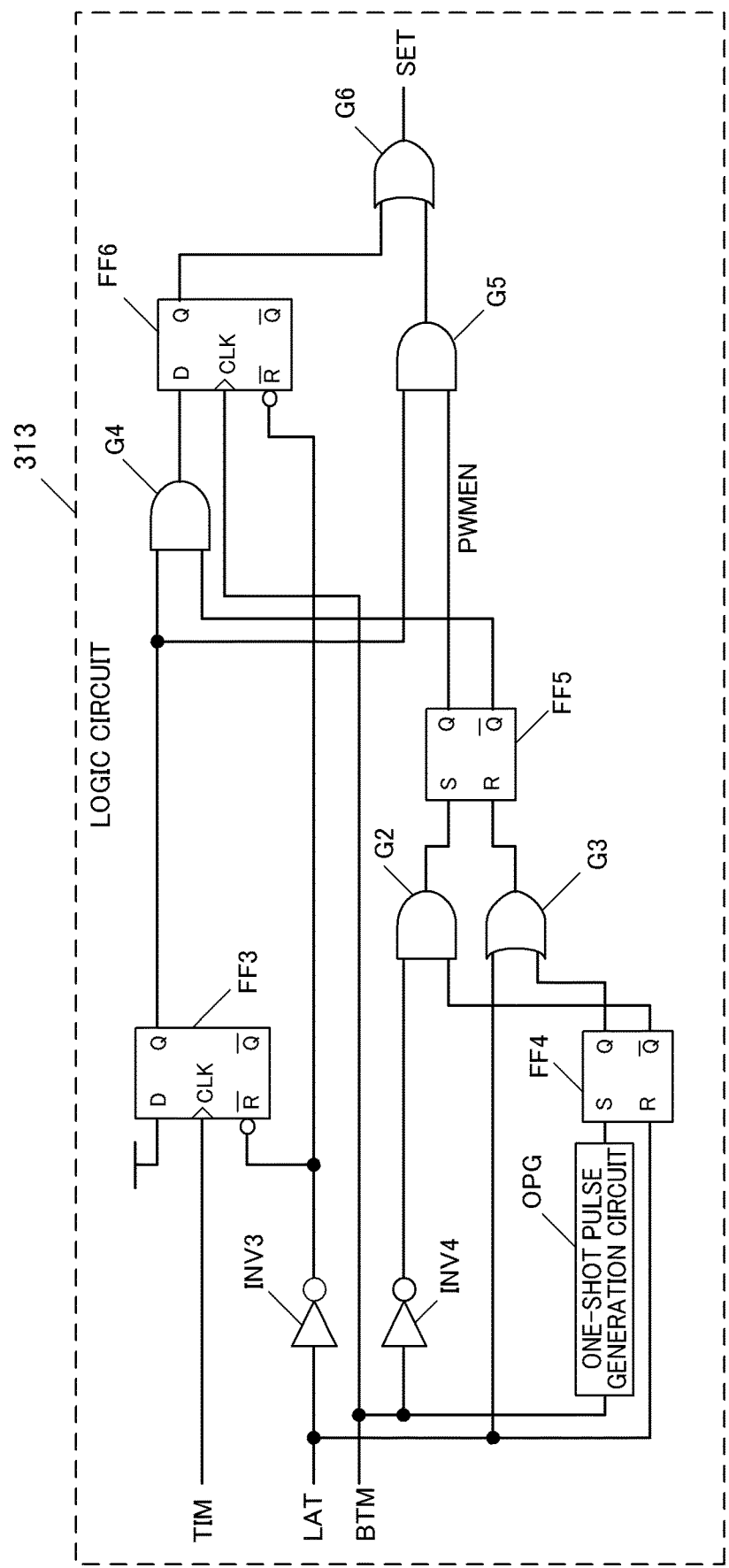
FIG. 17 is a circuit diagram illustrating a modification example of a logic circuit forming the turn-on trigger generation circuit of the switching power supply semiconductor device according to the example illustrated in FIG. 3.
Figure 18:
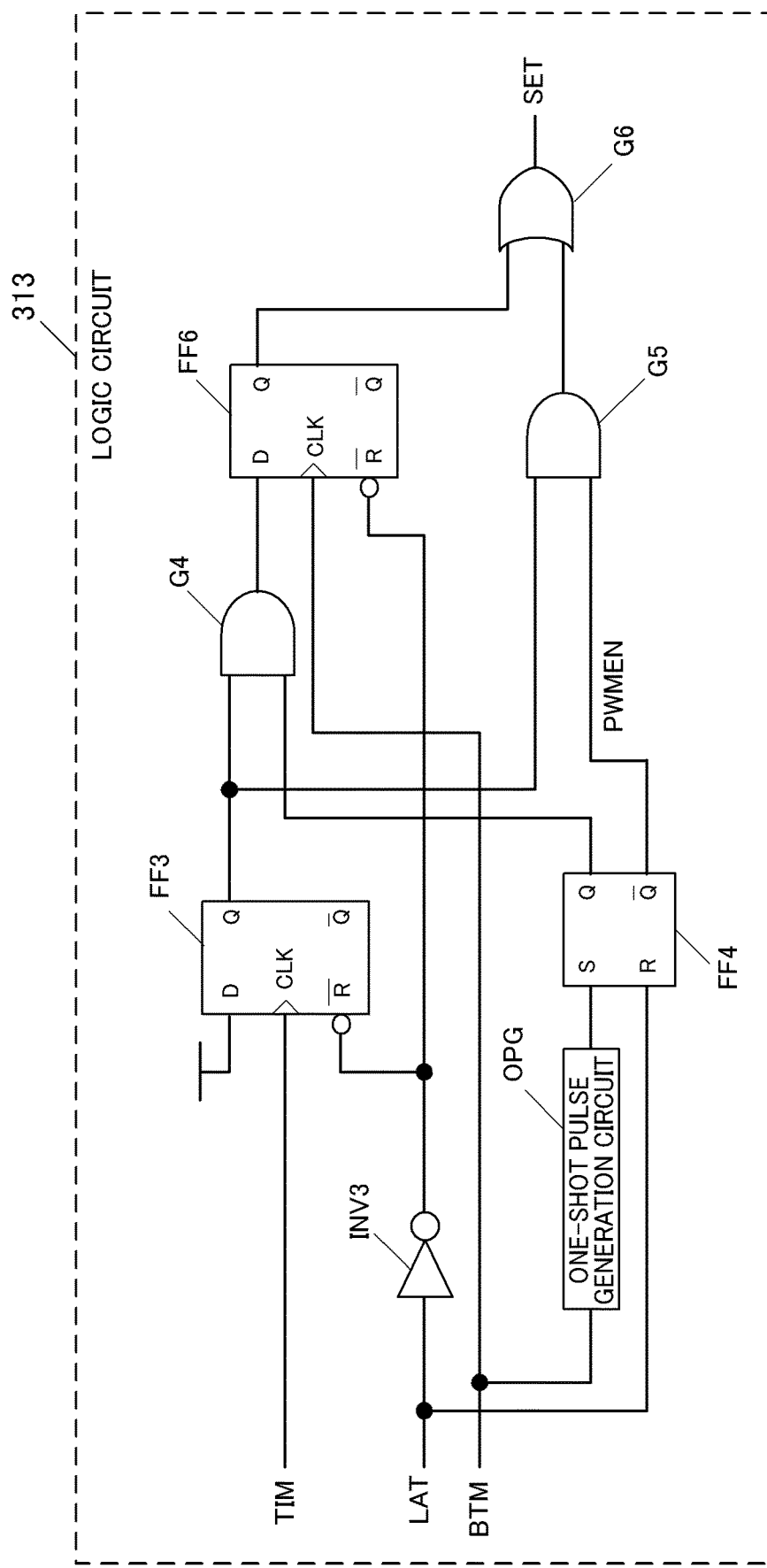
FIG. 18 is a circuit diagram illustrating another modification example of the logic circuit.
Figure 19:
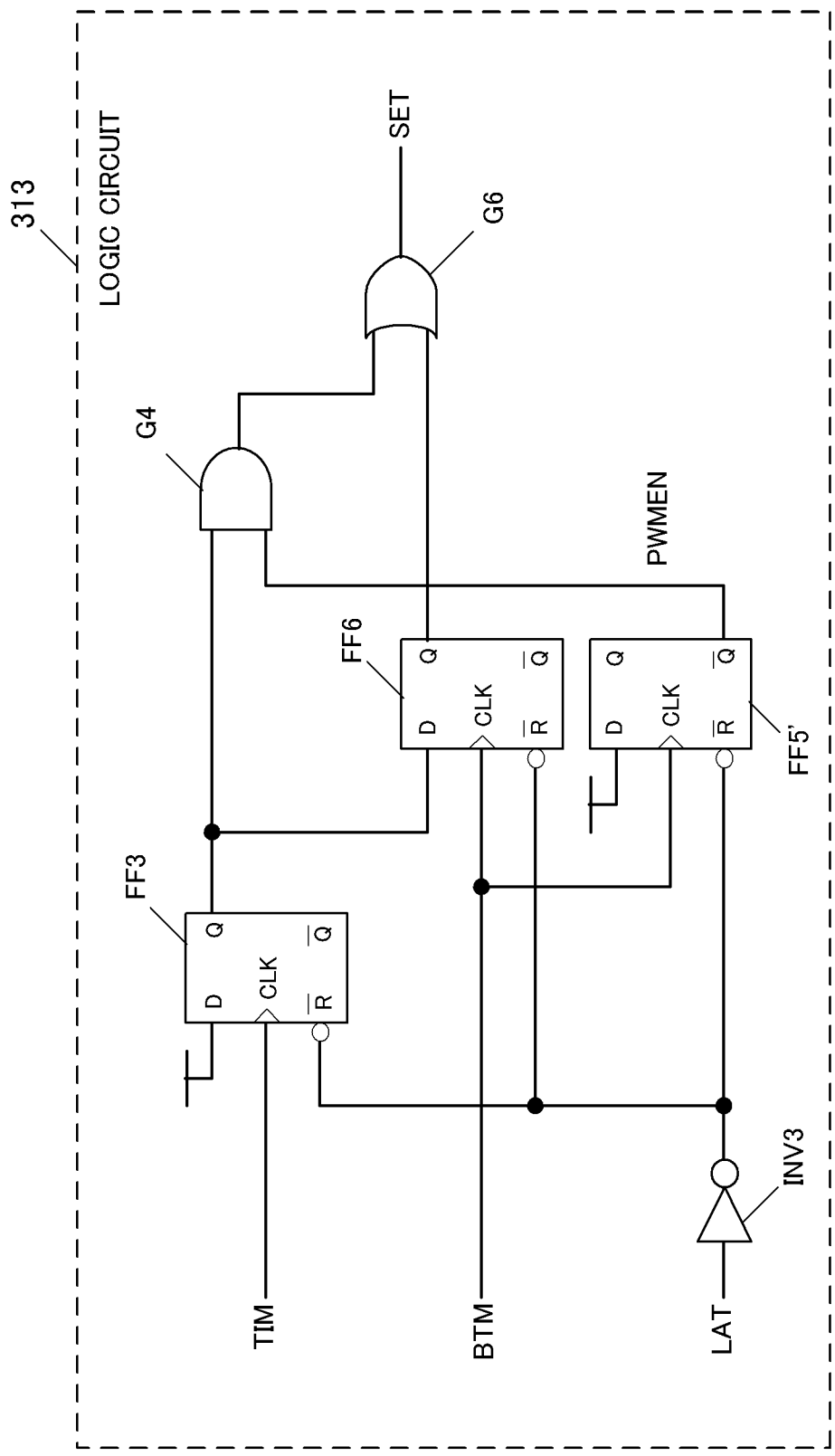
FIG. 19 is a circuit diagram illustrating still another modification example of the logic circuit.

FIG. 17 illustrates another example of the configuration of the logic circuit 313 in the turn-on trigger generation circuit 31. FIGS. 18 and 19 illustrate modification examples of the configuration.

In the examples, the logic circuit 313 illustrated in FIG. 17 includes:

a D-type flip-flop FF3 having a clock terminal to which the output signal TIM of the timer circuit 312 is input;

an inverter INV3 that inverts the output LAT of the latch circuit 33;

an inverter INV4 that inverts the output BTM of the bottom detection circuit 311;

an one-shot pulse generation circuit OPG that detects the rising of the output BTM and generates a pulse signal; and an RS flip-flop FF4 that uses the output of the one-shot pulse generation circuit OPG as a set signal and uses the output LAT of the latch circuit 33 as a reset signal.

In addition, the logic circuit 313 illustrated in FIG. 17 includes:

an AND gate G2 that receives the output of the inverter INV4 and the inverted output /Q of the RS flip-flop FF4 as inputs;

an OR gate G3 that receives the output LAT of the latch circuit 33 and the output Q of the RS flip-flop FF4 as inputs;

an RS flip-flop FF5 that uses the output of the AND gate G2 as a set signal and uses the output of the OR gate G3 as a reset signal;

an AND gate G4 that receives the output Q(PWMEN) of the D-type flip-flop FF3 and the inverted output /Q of the RS flip-flop FF5 as inputs; and a D-type flip-flop FF6 that has a clock terminal to which the output BTM of the bottom detection circuit 311 is input and receives the output of the AND gate G4.

Further, the logic circuit 313 illustrated in FIG. 17 includes:

an AND gate G5 that receives the output Q of the D-type flip-flop FF3 and the output Q of the RS flip-flop FF5 as inputs; and an OR gate G6 that receives the output of the AND gate G5 and the output Q of the RS flip-flop FF5 as inputs.

The output of the OR gate G6 is supplied as a trigger signal SET for turning on the switching transistor SW1 to the latch circuit 33 such that the latch circuit 33 is set. The D-type flip-flop FF6 is configured to be reset by the output of the inverter INV3 that inverts the output LAT of the latch circuit 33.

The output signal TIM of the timer circuit 312 input to the logic circuit 313 is a timing signal that changes at the time when the time Ta corresponding to the voltage VFB of the external terminal FB is measured. The logic circuit 313 operates as follows. In a case where the output BTM of the bottom detection circuit 311 rises first, the output signal TIM of the timer circuit 312 rises following the rising of the output BTM and the turn-on trigger signal SET changes at the timing when the output BTM of the bottom detection circuit 311 rises again. In a case where the time Ta elapses before the output BTM of the bottom detection circuit 311 is input, the timer circuit 312 measures the time Ta and the turn-on trigger signal SET changes at the timing when the output signal TIM changes.

Figure 21:
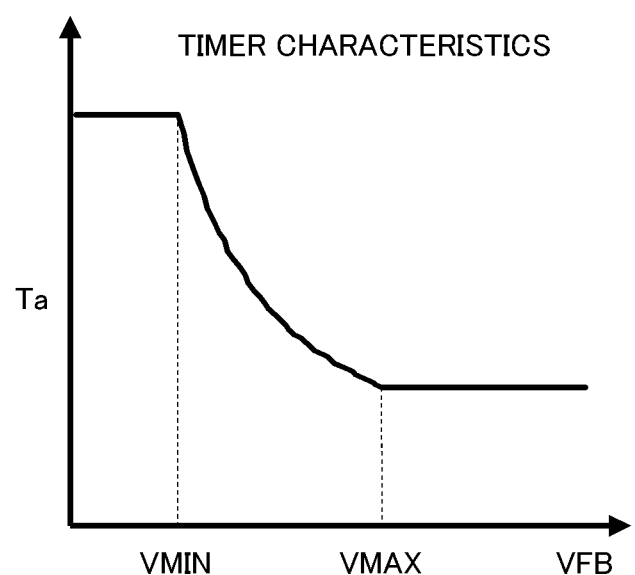
FIG. 21 is a graph showing a relationship between a measured time Ta and a feedback voltage VFB to an external terminal FB in a timer circuit forming the turn-on trigger generation circuit illustrated in FIG. 6.

As shown in FIG. 21, in a case where the time Ta measured by the timer circuit 312 is designed to be inversely proportional to the voltage VFB (1/Ta which is the reciprocal of Ta is a linear function or constant with respect to the voltage VFB), as the voltage VFB of the external terminal FB becomes lower, that is, the amount of output current on the secondary side becomes smaller, the time Ta becomes longer and the switching frequency of the switching transistor SW1 becomes lower. As a result, in a case where the output BTM of the bottom detection circuit 311 changes before the output signal TIM of the timer circuit 312 changes, the output signal TIM of the timer circuit 312 changes and the switching transistor SW1 is turned on at the next bottom of the potential of the external terminal DMG. At that time, so-called soft switching in which the switching transistor SW1 is turned on at the timing when the voltage of the switching transistor SW1 (the voltage between the drain and the source in the case of the MOS transistor) is set to zero volts is performed and high power efficiency is obtained. That is, the power supply control IC 13 performs switching control in the so-called quasi-resonance mode in which high power efficiency is obtained. In this case, a switching cycle is longer than the time Ta measured by the timer circuit 312.

As the voltage VFB of the external terminal FB becomes higher, that is, the amount of output current on the secondary side becomes larger, the time Ta becomes shorter and the output signal TIM of the timer circuit 312 changes earlier than the output BTM of the bottom detection circuit 311. The switching transistor SW1 is turned on at the same time as the time Ta is measured. Therefore, the switching cycle is determined only by the time Ta and the operation is performed in the PWM mode. In addition, it is preferable that the measured time Ta is clamped so as to be constant in a region in which the voltage VFB is relatively low and a region in which the voltage VFB is relatively high, as illustrated in FIG. 21.

As can be seen from the above description of the operation, the logic circuit 313 functions as a means for switching the mode between the PWM mode and the quasi-resonance mode. In the power supply control IC 13 according to this embodiment, for example, the appropriate design of the time Ta measured by the timer circuit 312 makes it possible for the power supply control IC 13 to operate in the PWM mode in a region in which the output current is close to 100% of the rated load current and to operate in the quasi-resonance mode in the region in which the output current is less than the value. In a power supply device using the power supply control IC 13 according to this embodiment, since power efficiency in the PWM mode is lower than that in the quasi-resonance mode, efficiency is not high in a case where the power supply device operates in the range in which the output current is close to 100% of the rated load current. However, in a region in which the output current is, for example, 75%, 50%, or 25% of the rated load current, the power supply device operates in the quasi-resonance mode in which power efficient is high. This configuration has an advantage that the average power efficiency is higher than that of the power supply device which operates in the PWM mode in all regions. In a case where the power supply device operates with the rated load current in the PWM mode, the current peak of the primary winding of a transformer is less than that in the power supply device which operates in the quasi-resonance mode and the transformer is less likely to be saturated. Therefore, this configuration has an advantage that it is possible to reduce the size of the transformer.

FIG. 18 illustrates a logic circuit 313 which differs from the logic circuit 313 illustrated in FIG. 17 in that the inverter INV4, the RS flip-flop FF5, the AND gate G2, and the OR gate G3 are omitted.

FIG. 19 illustrates a logic circuit 313 which differs from the logic circuit 313 illustrated in FIG. 17 in that:
the inverter INV4, the one-shot pulse generation circuit OPG, the AND gate G2, and the OR gate G3 are omitted;
the D-type flip-flop FF6 directly latches the output of the D-type flip-flop FF3 without passing through the AND gate G4; and
a D-type flip-flop FF5' is used instead of the RS flip-flop FF5.

Figure 20A:
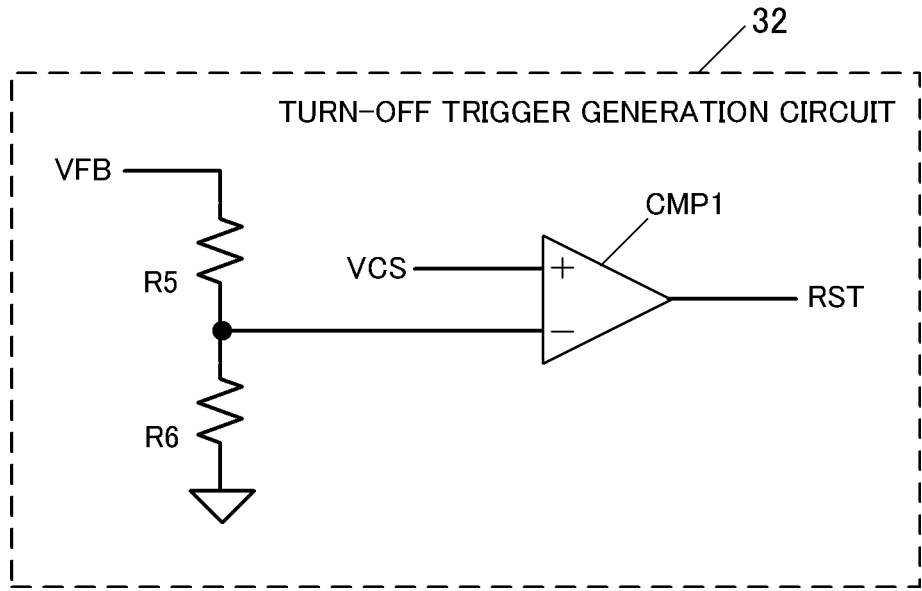
FIG. 20A is a circuit diagram illustrating a modification example of a turn-off trigger generation circuit.
Figure 20B:
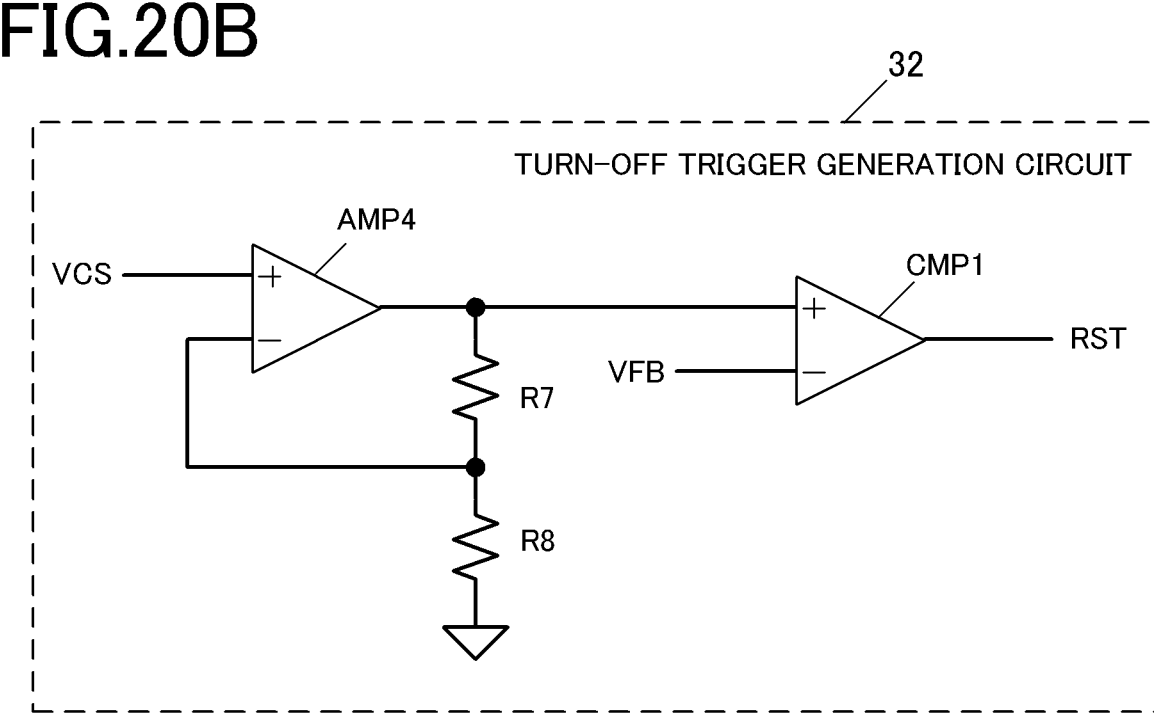
FIG. 20B is a circuit diagram illustrating another modification example of a turn-off trigger generation circuit.

FIGS. 20A and 20B illustrate other examples of the configuration of the turn-off trigger generation circuit 32.

FIG. 20A illustrates a configuration in which voltage division resistors R5 and R6 that divide the voltage VFB of the external terminal FB are provided and a voltage obtained by dividing the voltage VFB and the voltage Vcs of the external terminal CS are input to the comparator CMP1 and then compared with each other. In addition, a voltage division resistor that divides the voltage Vcs of the external terminal CS may be provided and a voltage obtained by dividing the voltage Vcs and the voltage VFB of the external terminal FB may be input to the comparator CMP1 and then compared with each other.

FIG. 20B illustrates a configuration in which an operational amplifier AMP4 that amplifies the voltage Vcs of the external terminal CS is provided in a stage in front of the comparator CMP1 and a voltage obtained by amplifying the voltage Vcs and the voltage VFB of the external terminal FB are input to the comparator CMP1 and then compared with each other. In addition, voltage division resistors R7 and R8 are provided between an output terminal of the operational amplifier AMP4 and a ground point. The operational amplifier AMP4 outputs the voltage amplified such that the input potential of a connection node of the voltage division resistors R7 and R8 is matched with the voltage Vcs of a non-inverting input terminal by a virtual ground operation.

The invention made by the inventors has been described in detail above on the basis of the embodiments. However, the invention is not limited to the embodiments. For example, in the embodiments, the switching transistor SW1 and the current sense resistor Rs1 are provided separately from the power supply control IC 13. However, the switching transistor SW1 may be incorporated into the power supply control IC 13 to form one semiconductor integrated circuit (the current sense resistor Rs1 is an external element).

In addition, instead of providing the current sense resistor Rs1, the magnitude of the drain current may be detected from the drain voltage of the internal switching transistor SW1.

In the embodiments, a case where the invention is applied to the DC-DC converter has been described. However, the invention may be applied to a switching power supply device having a transformer such as an AC-DC converter.

What is claimed is:

1. A switching power supply device comprising:
    a voltage conversion transformer including an auxiliary winding;
    a primary-side control semiconductor device that generates a driving signal which controls turn-on and turn-off of a switching element connected in series to a primary winding of the voltage conversion transformer;
    a rectification and smoothing circuit that is connected to a secondary winding of the voltage conversion transformer;
    an output voltage detection circuit that detects a secondary-side output voltage of the voltage conversion transformer and transmits a feedback signal corresponding to the secondary-side output voltage to the primary-side control semiconductor device through an insulated signal transmitter;
    a failure detection circuit including a current detection terminal that detects a secondary-side current of the voltage conversion transformer and a voltage detection terminal that detects the secondary-side output voltage; and
    a switch that cuts off a current flowing to the insulated signal transmitter,
    wherein:
    the primary-side control semiconductor device comprises:
        a first external terminal to which a voltage corresponding to the feedback signal supplied from the output voltage detection circuit is input;
        a second external terminal to which a voltage induced in the auxiliary winding or a voltage obtained by dividing the induced voltage is input; and
        an overvoltage detection circuit including a first voltage comparator that detects whether a voltage of the first external terminal is higher than a first predetermined threshold voltage and a second voltage comparator that detects whether a voltage of the second external terminal is higher than a second predetermined threshold voltage,
    in a case where the first voltage comparator and the second voltage comparator determine that the voltage of the first external terminal and the voltage of the second external terminal exceed the first threshold voltage and the second threshold voltage, respectively, the overvoltage detection circuit generates a signal to stop generation of the driving signal, and
    in a case where the failure detection circuit detects an overvoltage or an overcurrent on the secondary side of the voltage conversion transformer, the switch is controlled such that the current flowing to the insulated signal transmitter is cut off and the voltages input to the first external terminal and the second external terminal rise.

2. The switching power supply device according to claim 1, wherein:
    the overvoltage detection circuit further includes a timer circuit that measures a predetermined time, and
    the overvoltage detection circuit generates the signal to stop generation of the driving signal for the switching element in a case where the first voltage comparator and the second voltage comparator determine that the voltage of the first external terminal and the voltage of the second external terminal exceed the first threshold voltage and the second threshold voltage, respectively, when the timer circuit measures a predetermined time after the switching element is turned off.

3. The switching power supply device according to claim 1, wherein:
    the insulated signal transmitter comprises a photocoupler,
    the switch is connected in series to a photodiode forming the photocoupler, and
    in a case where the failure detection circuit detects the overvoltage or the overcurrent on the secondary side of the voltage conversion transformer, the failure detection circuit turns off the switch such that a current flowing to the photodiode is cut off.

4. The switching power supply device according to claim 1, further comprising:
    a switch that is connected between the rectification and smoothing circuit and a secondary-side output terminal,
    wherein the switch is turned off by the failure detection circuit when the current flowing to the insulated signal transmitter is cut off.

5. The switching power supply device according to claim 1, wherein:
    the rectification and smoothing circuit includes a MOS transistor as a rectification element,
    a synchronous rectification control circuit that controls turn-on and turn-off of the MOS transistor based on a drain voltage and a source voltage of the MOS transistor is provided on the secondary side of the voltage conversion transformer,
    the failure detection circuit is an open state detection circuit that detects an open state of a drain terminal and/or a gate terminal of the MOS transistor based on the drain voltage and the source voltage of the MOS transistor, and
    in a case where the open state detection circuit detects the open state, the failure detection circuit generates and outputs a signal to cut off the current flowing to the insulated signal transmitter.

6. The switching power supply device according to claim 1, further comprising:
    a temperature detection element on the secondary side of the voltage conversion transformer,
    wherein, in a case where it is detected that temperature is equal to or greater than a predetermined value based on a signal from the temperature detection element, the failure detection circuit generates and outputs a signal to cut off the current flowing to the insulated signal transmitter.

7. The switching power supply device according to claim 1, wherein:
    the failure detection circuit has a terminal that receives a signal notifying occurrence of a failure from an external device, and
    in a case where the signal notifying the occurrence of the failure is received, the failure detection circuit generates and outputs a signal to cut off the current flowing to the insulated signal transmitter.

8. A switching power supply device comprising:
    a voltage conversion transformer including an auxiliary winding;
    a primary-side control semiconductor device that generates a driving signal which controls turn-on and turn-off of a switching element connected in series to a primary winding of the voltage conversion transformer;

a rectification and smoothing circuit that is connected to a secondary winding of the voltage conversion transformer;

an output voltage detection circuit that detects a secondary-side output voltage of the voltage conversion transformer and transmits a feedback signal corresponding to the secondary-side output voltage to the primary-side control semiconductor device through an insulated signal transmitter;

a failure detection circuit including a current detection terminal that detects a secondary-side current of the voltage conversion transformer and a voltage detection terminal that detects the secondary-side output voltage; and a switch that cuts off a current flowing to the insulated signal transmitter, wherein:

the primary-side control semiconductor device comprises:
  a first external terminal to which a voltage corresponding to the feedback signal supplied from the output voltage detection circuit is input;
  a second external terminal to which a voltage induced in the auxiliary winding or a voltage obtained by dividing the induced voltage is input; and
  an overvoltage detection circuit including a first voltage comparator that compares a voltage of the first external terminal with a first predetermined threshold voltage and a second voltage comparator that compares a voltage of the second external terminal with a second predetermined threshold voltage, and
in a case where the failure detection circuit detects that the secondary-side current or the secondary-side output voltage of the voltage conversion transformer exceeds a predetermined value, the switch is controlled such that the current flowing to the insulated signal transmitter is cut off, and outputs of the first voltage comparator and the second voltage comparator are inverted to stop the driving signal for the switching element.

9. The switching power supply device according to claim 8, wherein:

the overvoltage detection circuit further includes a timer circuit that measures a predetermined time, and the overvoltage detection circuit generates a signal to stop generation of the driving signal for the switching element in a case where the first voltage comparator and the second voltage comparator determine that the voltage of the first external terminal and the voltage of the second external terminal exceed the first threshold voltage and the second threshold voltage, respectively, when the timer circuit measures a predetermined time after the switching element is turned off.

10. The switching power supply device according to claim 8, wherein:

the insulated signal transmitter comprises a photocoupler, the switch is connected in series to a photodiode forming the photocoupler, and in a case where the failure detection circuit detects that the secondary-side current or the secondary-side output voltage of the voltage conversion transformer exceeds the predetermined value, the failure detection circuit turns off the switch such that a current flowing to the photodiode is cut off.

11. The switching power supply device according to claim 8, further comprising:

a switch that is connected between the rectification and smoothing circuit and a secondary-side output terminal, wherein the switch is turned off by the failure detection circuit when the current flowing to the insulated signal transmitter is cut off.

12. The switching power supply device according to claim 8, wherein:

the rectification and smoothing circuit includes a MOS transistor as a rectification element, a synchronous rectification control circuit that controls turn-on and turn-off of the MOS transistor based on a drain voltage and a source voltage of the MOS transistor is provided on the secondary side of the voltage conversion transformer, the failure detection circuit is an open state detection circuit that detects an open state of a drain terminal and/or a gate terminal of the MOS transistor based on the drain voltage and the source voltage of the MOS transistor, and in a case where the open state detection circuit detects the open state, the failure detection circuit generates and outputs a signal to cut off the current flowing to the insulated signal transmitter.

13. The switching power supply device according to claim 8, further comprising:

a temperature detection element on the secondary side of the voltage conversion transformer, wherein, in a case where it is detected that temperature is equal to or greater than a predetermined value based on a signal from the temperature detection element, the failure detection circuit generates and outputs a signal to cut off the current flowing to the insulated signal transmitter.

14. The switching power supply device according to claim 8, wherein:

the failure detection circuit has a terminal that receives a signal notifying occurrence of a failure from an external device, and in a case where the signal notifying the occurrence of the failure is received, the failure detection circuit generates and outputs a signal to cut off the current flowing to the insulated signal transmitter.

15. A switching power supply device comprising:

a voltage conversion transformer including an auxiliary winding;

a primary-side control semiconductor device that generates a driving signal which controls turn-on and turn-off of a switching element connected in series to a primary winding of the voltage conversion transformer;

a rectification and smoothing circuit that is connected to a secondary winding of the voltage conversion transformer;

an output voltage detection circuit that detects a secondary-side output voltage of the voltage conversion transformer and transmits a feedback signal corresponding to the secondary-side output voltage to the primary-side control semiconductor device through an insulated signal transmitter;

a failure detection circuit including a current detection terminal that detects a secondary-side current of the voltage conversion transformer; and a switch that cuts off a current flowing to the insulated signal transmitter, wherein:
the primary-side control semiconductor device comprises:
a first external terminal to which a voltage corresponding to the feedback signal supplied from the output voltage detection circuit is input;
a second external terminal to which a voltage induced in the auxiliary winding or a voltage obtained by dividing the induced voltage is input; and
an overvoltage detection circuit including a first voltage comparator that compares a voltage of the first external terminal with a first predetermined threshold voltage and a second voltage comparator that compares a voltage of the second external terminal with a second predetermined threshold voltage, and
in a case where the failure detection circuit detects that the secondary-side current of the voltage conversion transformer exceeds a predetermined value, the switch is controlled such that the current flowing to the insulated signal transmitter is cut off, and outputs of the first voltage comparator and the second voltage comparator are inverted to stop the driving signal for the switching element.

16. The switching power supply device according to claim 15, wherein:
the overvoltage detection circuit further includes a timer circuit that measures a predetermined time, and
the overvoltage detection circuit generates a signal to stop generation of the driving signal for the switching element in a case where the first voltage comparator and the second voltage comparator determine that the voltage of the first external terminal and the voltage of the second external terminal exceed the first threshold voltage and the second threshold voltage, respectively, when the timer circuit measures a predetermined time after the switching element is turned off.

17. The switching power supply device according to claim 15, wherein:
the insulated signal transmitter comprises a photocoupler,
the switch is connected in series to a photodiode forming the photocoupler, and
in a case where the failure detection circuit detects that the secondary-side current of the voltage conversion transformer exceeds the predetermined value, the failure detection circuit turns off the switch such that a current flowing to the photodiode is cut off.

18. The switching power supply device according to claim 15, further comprising:
a switch that is connected between the rectification and smoothing circuit and a secondary-side output terminal,
wherein the switch is turned off by the failure detection circuit when the current flowing to the insulated signal transmitter is cut off.

19. The switching power supply device according to claim 15, wherein:
the rectification and smoothing circuit includes a MOS transistor as a rectification element,
a synchronous rectification control circuit that controls turn-on and turn-off of the MOS transistor based on a drain voltage and a source voltage of the MOS transistor is provided on the secondary side of the voltage conversion transformer,
the failure detection circuit is an open state detection circuit that detects an open state of a drain terminal and/or a gate terminal of the MOS transistor based on the drain voltage and the source voltage of the MOS transistor, and
in a case where the open state detection circuit detects the open state, the failure detection circuit generates and outputs a signal to cut off the current flowing to the insulated signal transmitter.

20. The switching power supply device according to claim 15, further comprising:
a temperature detection element on the secondary side of the voltage conversion transformer,
wherein, in a case where it is detected that temperature is equal to or greater than a predetermined value based on a signal from the temperature detection element, the failure detection circuit generates and outputs a signal to cut off the current flowing to the insulated signal transmitter.

21. The switching power supply device according to claim 15, wherein:
the failure detection circuit has a terminal that receives a signal notifying occurrence of a failure from an external device, and
in a case where the signal notifying the occurrence of the failure is received, the failure detection circuit generates and outputs a signal to cut off the current flowing to the insulated signal transmitter.

\* \* \* \* \*